(12) United States Patent
Nakagawa et al.

(10) Patent No.: US 7,267,100 B2
(45) Date of Patent: Sep. 11, 2007

(54) CONTROLLER OF INTERNAL COMBUSTION ENGINE

(75) Inventors: Shinji Nakagawa, Hitachinaka (JP);
Minoru Oosuga, Hitachinaka (JP);
Masami Nagano, Hitachinaka (JP);
Mamoru Nemoto, Hitachiota (JP);
Toshio Hori, Hitachinaka (JP)

(73) Assignees: Hitachi, Ltd., Tokyo (JP); Hitachi Car Engineering Co., Ltd., Hitachinaka-shi (JP)

(*) Notice: Subject to any disclaimer, the term of this patent is extended or adjusted under 35 U.S.C. 154(b) by 0 days.

(21) Appl. No.: 10/473,772

(22) PCT Filed: Apr. 3, 2001

(86) PCT No.: PCT/JP01/02901

§ 371 (c)(1),
(2), (4) Date: Dec. 22, 2004

(87) PCT Pub. No.: WO02/081888

PCT Pub. Date: Oct. 17, 2002

(65) Prior Publication Data

US 2005/0103309 A1    May 19, 2005

(51) Int. Cl.
*F02D 31/00*   (2006.01)
*F02D 41/00*   (2006.01)

(52) U.S. Cl. ................................ 123/376; 123/361

(58) Field of Classification Search .......... 701/102, 701/103; 123/376, 391, 361, 399, 558.11, 123/568.21
See application file for complete search history.

(56) References Cited

U.S. PATENT DOCUMENTS 5,048,495 A * 9/1991 Onari et al. .............. 123/492
5,722,368 A * 3/1998 Sakai .................... 123/339.23

FOREIGN PATENT DOCUMENTS

JP   06-146950    11/1992
JP   2000-097086   9/1998

* cited by examiner

*Primary Examiner*—John T. Kwon
(74) *Attorney, Agent, or Firm*—Crowell & Moring LLP

(57) ABSTRACT

An internal combustion engine controller, is used with a fuel-based torque-on-demand control type, multi-cylinder, direct-injection internal combustion engine, to provide an air flow rate control that excels in response and convergence. The internal combustion engine controller includes a section for computing a target throttle opening from operating conditions, which in turn includes a first computing section for determining a target throttle opening by feedback control in accordance with operating conditions including an intake air flow rate; a second computing section for determining a target throttle opening by feed-forward control in accordance with operating conditions; and a third computing means for determining a target throttle opening based on the target throttle opening value determined by the first computing means and the second computing means.

6 Claims, 27 Drawing Sheets

⟨FUEL INJECTION QUANTITY COMPUTING SECTION⟩

⟨FUEL INJECTION QUANTITY CORRECTION SECTION⟩

⟨TARGET AIR FLOW RATE COMPUTING SECTION⟩

⟨ACTUAL AIR FLOW RATE COMPUTING SECTION⟩

⟨TARGET THROTTLE OPENING COMPUTING SECTION⟩

⟨TARGET THROTTLE OPENING COMPUTING SECTION⟩

⟨TARGET THROTTLE OPENING COMPUTING SECTION⟩

⟨TARGET THROTTLE OPENING COMPUTING SECTION⟩

⟨TARGET THROTTLE OPENING COMPUTING SECTION⟩

⟨ACTUAL AIR FLOW RATE COMPUTING SECTION⟩

CONTROLLER OF INTERNAL COMBUSTION ENGINE

FIELD OF THE INVENTION

The present invention related to internal combustion engine controllers, and more particularly to an internal combustion engine controller for accurately adjusting the air flow rate by controlling the air flow rate with an electronic control valve.

BACKGROUND OF THE INVENTION

In recent years, worldwide efforts have been made to provide increased energy savings. In the field of automotive technology, the development of a fuel-efficient internal combustion engine has been required for energy saving purposes. The most conspicuous internal combustion engine meeting such a demand is a lean-burn internal combustion engine. In particular, an in-cylinder fuel injection internal combustion engine, which is a lean-burn internal combustion engine, injects fuel directly into a cylinder to stratify an air-fuel mixture, thereby making it possible to achieve combustion at an air-fuel ratio of higher than 40 and reduce the pump loss.

In a lean-burn in-cylinder fuel injection internal combustion engine system, which is described above, the air flow rate is not proportional to the torque. Therefore, the lean-burn in-cylinder fuel injection internal combustion engine system generally uses an electronic throttle for electronically controlling the air flow rate unlike a conventional internal combustion engine system.

For the above lean-burn in-cylinder fuel injection internal combustion engine system, torque-on-demand control is required to provide torque desired by the driver at a wide-range air-fuel ratio. Two types of torque-on-demand control are an air-based type and a fuel-based type.

If air-based torque-on-demand control is exercised, a target torque computation section and a target air-fuel ratio computation section determine a target torque and target air-fuel ratio, respectively, as shown in FIG. 27. A target air flow rate computation section for providing the target torque and target air-fuel ratio computes a target air flow rate. An electronic throttle controls the air flow rate. An air flow rate sensor detects an actual air flow rate. A fuel injection quantity computation section determines the quantity of fuel injection from the actual air flow rate and target air-fuel ratio.

If, on the other hand, fuel-based torque-on-demand control is exercised, a target torque computation section determines a target torque as shown in FIG. 28. A fuel injection quantity computation section then determines the quantity of fuel injection for providing the target torque. A target air computation section computes a target air flow rate from the fuel injection quantity and target air-fuel ratio. An electronic throttle controls the air flow rate. Further, fuel-based torque-on-demand control can be exercised to provide feedback control over the air flow rate in accordance with a value output by an air flow sensor.

Fuel-based torque-on-demand control described above uses an electronic throttle to exercise air flow rate control after fuel injection quantity determination. However, a transmission characteristic exists between the electronic throttle and cylinder. More specifically, a transient phenomenon occurs because it generally takes tens to hundreds of milliseconds for the air flow rate controlled near the electronic throttle to arrive in a cylinder as shown in FIG. 29. In an in-cylinder fuel injection internal combustion engine, on the other hand, fuel injection directly occurs within a cylinder. Therefore, the transmission characteristic of the fuel injection side is smaller than that of the air side because time is merely wasted by intermittent combustion.

Meanwhile, the exhaust pipe for an internal combustion engine is usually provided with a three-way catalyst or a catalyst having a three-way catalytic function as an exhaust gas emission purification system. As shown in FIG. 30, the three-way catalyst efficiently purifies carbon hydride (HC), carbon monoxide (CO), which are reducers, and nitrogen oxide (NOx), which is an oxidant, only in the neighborhood of a theoretical air-fuel ratio. From the viewpoint of exhaust gas emission reduction, it is desirable that the air-fuel ratio for an internal combustion engine be adjusted for the theoretical air-fuel ratio.

As regards a lean air-fuel ratio, there is a correlation between the air fuel ratio and internal combustion engine combustion stability as shown in FIG. 31. It is therefore necessary to control the air fuel ratio for the purpose of providing combustion stability of an internal combustion engine. Thus, when an air flow rate transient phenomenon in a cylinder is considered, the fuel injection quantity needs to be controlled from the viewpoint of exhaust gas emission reduction for theoretical air-fuel ratio or from the viewpoint of internal combustion engine combustion stability for lean air-fuel ratio.

Further, the torque of an internal combustion engine is determined almost conclusively by the fuel injection quantity. Therefore, the torque-response is determined by the transient characteristic of air flow rate. As is obvious from the above description, the most important tasks to be accomplished for an internal combustion engine that provides fuel-based torque-on-demand control are to improve the response to air flow rate control and convergence performance, minimize the variations among mass-produced products, and improve the robustness for changes with time.

A technology disclosed by JP-A No. 2000-97086 provides control over the air-fuel ratio of an internal combustion engine. When the target air flow rate changes, this technology provides delay compensation to improve the air flow rate response within a cylinder by temporarily permitting the throttle opening to overshoot the degree of throttle opening for achieving the target air flow rate. However, this control method cannot exercise air flow rate control if the air flow sensor is faulty because it computes the target throttle opening in accordance with the deviation between the actual air flow rate and target air flow rate.

Another technology disclosed by JP-A No. 6-146950 changes the throttle opening by a predetermined amount, if there is any change in the target air-fuel ratio, to eliminate any inadequate feedback response portion of the actual air flow rate with a view toward response improvement. However, since this control method does not detect the actual air flow rate, it cannot properly respond, for instance, to air density changes at a high altitude and exhibits low robustness for air flow rate control accuracy in relation to various environmental changes such as throttle control sensor and actuator characteristic variations.

In consideration of the problems described above, it is an object of the present invention to provide an internal combustion engine controller that is capable of exercising high-performance air flow rate control of a fuel-based torque-on-demand control type, in-cylinder fuel injection internal combustion engine while providing improved response and convergence and enhanced robustness.

SUMMARY OF THE INVENTION

To achieve the above object, an internal combustion engine controller of the present invention basically comprises means for computing a target throttle opening in accordance with operating conditions. The means for computing a target throttle opening comprises a first computing means, which determines a target throttle opening by exercising feedback control in accordance with operating conditions including an intake air volume; a second computing means, which determines a target throttle opening by exercising feed-forward control in accordance with the operating conditions; and a third computing means, which determines a target throttle opening in accordance with the respective target throttle opening values determined by the first computing means and second computing means.

In another aspect of the present invention, an internal combustion engine controller comprises: a target air flow rate computing means for computing a target air flow rate in accordance with operating conditions; a first computing means for determining a target throttle opening by exercising feedback control in accordance with a difference between the above target air flow rate and an actual air flow rate; a second computing means for determining a target throttle opening by exercising feed-forward control in accordance with the above target air flow rate; and a third computing means for determining a target throttle opening in accordance with the respective target throttle opening values determined by the first computing means and second computing means.

In still another aspect of the present invention, an internal combustion engine controller for computing a target throttle opening in accordance with operating conditions comprises: a first computing means for determining a target throttle opening by exercising feedback control in accordance with operating conditions including the intake air volume; a second computing means for determining a target throttle opening by exercising feed-forward control in accordance with the operating conditions; a third computing means for determining a target throttle opening in accordance with the target throttle opening values determined by the first computing means and second computing means; and a throttle opening control means for driving a throttle valve in accordance with the target throttle calculated by the third computing means.

As indicated by the configuration described above, the internal combustion engine controller of the present invention comprises a first throttle opening computing means for computing a throttle opening by exercising feedback control (F/B control) in accordance with the actual air flow rate, target air flow rate, and other operating conditions and a second throttle opening computing means for computing a throttle opening by exercising feed-forward control (F/F control) in accordance with the target air flow rate and other operating conditions. Therefore, the internal combustion engine controller of the present invention can improve the air flow rate calculation response and convergence, reduce the exhaust gas emission, and provides improved torque response without being affected by various environmental changes or sensor, actuator, and other component variations.

In other words, the internal combustion engine controller of the present invention is particularly suitable for a fuel-based torque-on-demand control type, internal combustion engine. It is basically characterized by comprising a second throttle opening computing means for computing a target throttle opening from a target air flow rate and a first throttle opening computing means for computing a target throttle opening from the deviation between a target air flow rate and actual air flow rate.

Common feedback control computes a manipulated variable in accordance with the resulting controlled variable. It is therefore said that the response of feedback control is theoretically inferior to that of feed-forward control. On the other hand, it is said that feed-forward control excels in response but exhibits low robustness against disturbance. The disadvantages of these two control functions are offset by the internal combustion engine controller of the present invention. Concisely, the internal combustion engine controller of the present invention provides a target throttle opening computing section that is capable of exercising feed-forward control, which is highly responsive, and feedback control, which is robust against disturbance. Consequently, the internal combustion engine controller of the present invention provides not only improved response but also enhanced robustness against disturbance particularly in air flow rate control over a fuel-based torque-on-demand control type, internal combustion engine.

To achieve another object, the internal combustion engine controller of the present invention uses the throttle opening control means, which comprises means for controlling the throttle valve in such a manner as to reduce the difference between a directly or indirectly detected actual throttle opening value and a target throttle opening value calculated by the third computing means.

As indicated by the configuration described above, the internal combustion engine controller of the present invention provides feedback control, which computes the manipulated variable of the throttle in accordance with the difference between the actual throttle opening and a target throttle opening calculated by the third target throttle opening computing means. Therefore, the manipulated variable for throttle drive can be computed from the target throttle opening and actual throttle opening. It means that the manipulated variable for throttle drive indicates a duty ratio that is entered into a drive circuit for controlling a throttle motor drive current. Thus, the manipulated variable for throttle drive can be accurately calculated by means of PID control.

In addition to feedback control, the internal combustion engine controller of the present invention also provides feed-forward control, which computes the manipulated variable of the throttle in accordance with only the target throttle opening calculated by the third target throttle opening computing means. Therefore, computation control can be exercised with high responsiveness. The feed-forward control portion may be a gain only. In such an instance, the manipulated variable for throttle opening control can be computed directly from a target air flow rate without computing a target throttle opening.

To achieve another object, the internal combustion engine controller of the present invention uses the target throttle opening computing means, which comprises a computation permission means for permitting the first target throttle opening computing means to compute a target throttle opening. The computation permission means inhibits the first target throttle opening computing means from computing a target throttle opening if the means for detecting the actual air flow rate directly or indirectly is found to be abnormal. The third target throttle opening computing means calculates a target throttle opening in accordance with the second target throttle opening so that the actual air flow rate can be adjusted for the target air flow rate.

As indicated in the configuration described above, the internal combustion engine controller of the present invention comprises a computation permission means for permitting the first target throttle opening computing means to compute a target throttle opening. Therefore, the first target throttle opening computing means can be permitted to compute a target throttle opening when, for instance, the opening of an internal combustion engine accelerator is normal, the air flow sensor function is normal, the throttle is normal, or the elapsed time from startup is as specified. It means that target throttle opening computations can be performed in response to changes in the internal combustion engine environment.

Even when the means for detecting the air flow rate directly or indirectly is found to be abnormal, it is possible to inhibit the first target throttle opening computing means from computing the first target throttle opening, cause the second target throttle opening computing means to calculate the second target throttle opening as the third target throttle opening, and control the actual air flow rate in accordance with the third target throttle opening. That is, if the means for detecting the air flow rate of the air flow sensor or the like is faulty, the actual air flow rate can be controlled by inhibiting the target throttle opening from being computed by feedback control and using the target throttle opening computed by feed-forward control as the target opening. Therefore, the air flow rate can be preferably controlled even when the air flow sensor or the like is faulty.

To achieve another object, the internal combustion engine controller of the present invention uses the computation permission means to inhibit the first target throttle opening computing means from computing the target throttle opening if the accelerator opening is not smaller than a predetermined value or the second target throttle opening is not smaller than a predetermined value. The third target throttle opening computing means computes the target throttle opening in accordance with the second target throttle opening and makes it possible to adjust the actual air flow rate for the target air flow rate. The computation permission means inhibits the first target throttle opening computing means from computing the target throttle opening if the difference between the target air flow rate and actual air flow rate is not greater than a predetermined value. The third target throttle opening computing means calculates the target throttle opening in accordance with the second target throttle opening and makes it possible to adjust the actual air flow rate to the target air flow rate.

To achieve another object, the internal combustion engine controller of the present invention uses the target throttle opening computing means, which comprises a computation permission means for permitting the second target throttle opening computing means to compute the target throttle opening in accordance with the operating conditions. The computation permission means inhibits the second target throttle opening computing means from computing the target throttle opening if a target exhaust gas re-circulation rate is not smaller than a predetermined value. The third target throttle opening computing means calculates the target throttle opening in accordance with the first target opening and makes it possible to adjust the actual air flow rate to the target air flow rate.

As indicated in the configuration described above, the internal combustion engine controller of the present invention comprises a second computation permission means, which permits the second target throttle opening computing means to compute a throttle opening. Therefore, if, for instance, the EGR rate is as specified or the air flow sensor is normal, the second target throttle opening computing means can be permitted to computer the target throttle opening. Thus, it is possible to compute the target throttle opening that is responsive to changes in the internal combustion engine environment.

To achieve another object, the internal combustion engine controller of the present invention uses the target throttle opening computing means to calculate the third target throttle opening from the first target throttle opening, which is computed in accordance with the actual air flow rate even when the relationship between the second target throttle opening and actual air flow rate significantly changes, and makes it possible to adjust the actual air flow rate for the target air flow rate.

As indicated in the configuration described above, the internal combustion engine controller of the present invention exercises feedback control to provide computation control so as to adjust the actual air flow rate for the target air flow rate and calculate the target throttle opening even when the relationship between the target throttle opening computed by feed-forward control and the actual air flow rate significantly changes due to an air density change, foreign matter inclusion in an intake pipe, or other environmental change. Therefore, the air flow rate can be accurately controlled in response to the above environmental changes.

To achieve another object, the internal combustion engine controller of the present invention uses the target throttle opening computing means, which comprises a target air flow rate correction means for correcting the target air flow rate. The first target throttle opening computing means computes the first target throttle opening in accordance with the difference between the target air flow rate calculated by the target air flow rate correction means and the actual air flow rate. The target air flow rate correction means represents a response characteristic between the second target throttle opening and actual air flow rate.

As indicated by the configuration described above, the internal combustion engine controller of the present invention comprises the target air flow rate correction means. Therefore, it can accurately compute a target air flow rate while improving the transmission characteristic by compensating for a time delay involved in intake air flow from the throttle to a cylinder.

To achieve another object, the internal combustion engine controller of the present invention uses the second target throttle opening computing means to compute the second target throttle opening in accordance with the internal combustion engine's rotating speed and the target air flow rate.

As indicated by the configuration described above, the internal combustion engine controller of the present invention can exercise feed-forward control to compute the second target throttle opening, for instance, from a map depicting the relationship between the internal combustion engine's rotating speed and the target air flow rate.

To achieve another object, the internal combustion engine controller of the present invention comprises means for computing the target exhaust gas re-circulation rate. Further, the second target throttle opening computing means computes the second target throttle opening in accordance with the internal combustion engine's rotating speed, the target air flow rate, and the target exhaust gas re-circulation rate.

To achieve another object, the internal combustion engine controller of the present invention uses the target air flow rate computing means to compute the target air flow rate in accordance with the target air-fuel ratio and target fuel injection quantity.

As indicated by the configuration described above, the internal combustion engine controller of the present invention can correct the second target throttle opening in accordance with the exhaust gas re-circulation rate when the EGR gas recirculates. More specifically, it can determine the target EGR rate from, for instance, a map depicting the relationship between a target combustion pressure torque and internal combustion engine's rotating speed, determine a throttle opening correction factor from, for instance, a map depicting the relationship between the target EGR rate and target air flow rate, and correct the second target throttle opening.

To achieve another object, the internal combustion engine controller of the present invention comprises a detection means for detecting the internal combustion engine's exhaust gas components directly or indirectly, and a correction amount computing means for computing the correction amount for the target air flow rate in accordance with the exhaust gas components detected by the detection means.

As indicated by the configuration described above, the internal combustion engine controller of the present invention corrects the target air flow rate with a correction amount (manipulated variable) that is used to compute (by means of air-fuel ratio feedback control) the correction amount for the target air flow rate in accordance with a signal from an A/F sensor or other exhaust gas component detection means. It is therefore possible to calculate a target air flow rate with increased accuracy and compute a target throttle opening.

To achieve another object, the internal combustion engine controller of the present invention uses the second target throttle opening computing means to compute the second target throttle opening in accordance with an inverse model for the response between an in-cylinder target air flow rate and the throttle.

To achieve still another object, the internal combustion engine controller of the present invention uses an in-cylinder air flow rate value, which is detected directly or indirectly, as an actual air flow rate value.

DETAILED DESCRIPTION OF THE PREFERRED EMBODIMENTS

Embodiments of an internal combustion engine controller according to the present invention will now be described in detail with reference to the accompanying drawings.

Figure 1:
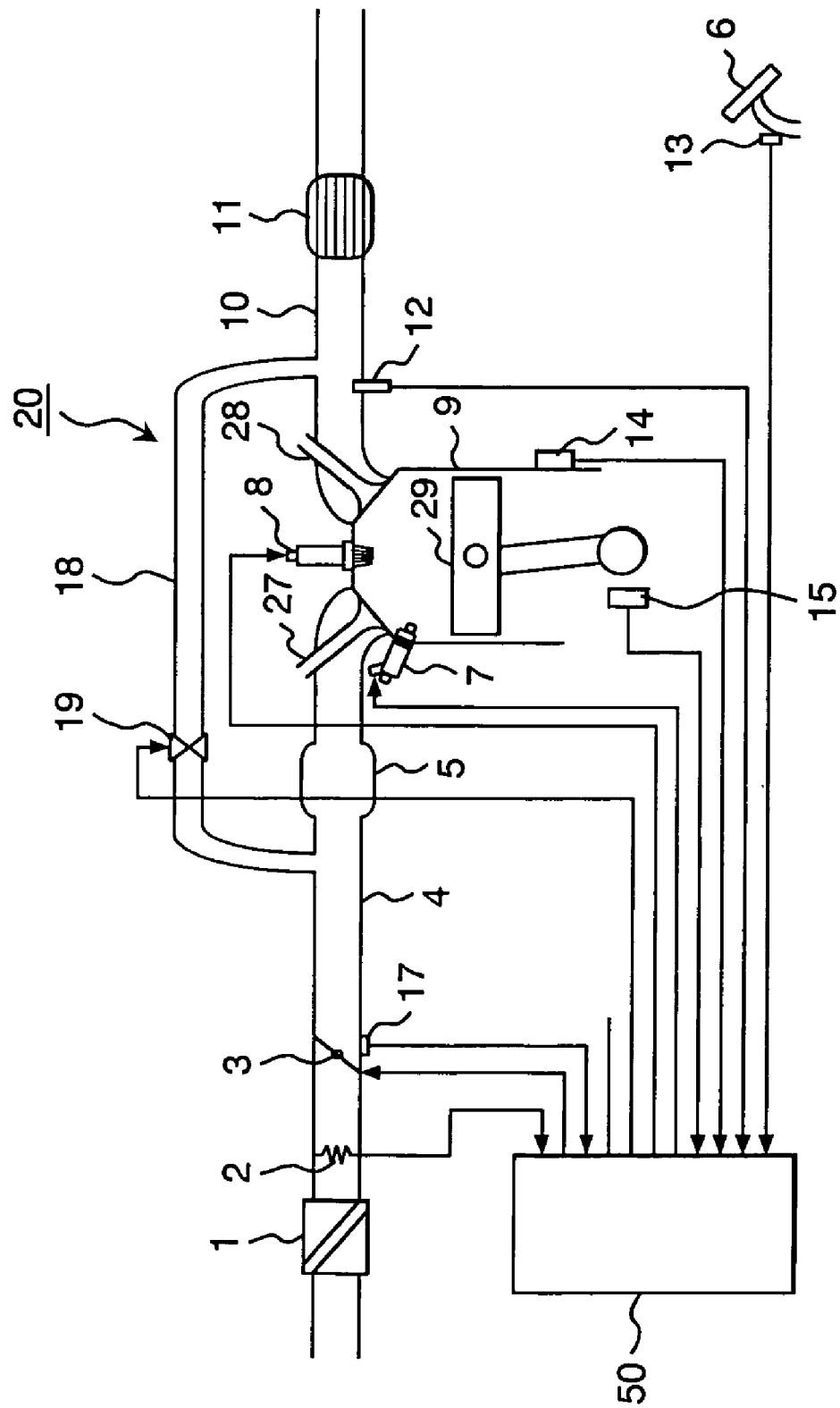
FIG. 1 illustrates the overall configuration of an internal combustion engine that comprises an internal combustion engine controller according to the present invention.

FIG. 1 illustrates an overall internal combustion engine system that is common to all embodiments to which an internal combustion engine controller according to the present invention is applied.

An internal combustion engine 20 comprises a multi-cylinder, in-cylinder fuel injection internal combustion engine. Its intake system is such that the air coming from the outside passes through an air cleaner 1, an intake manifold 4, and a collector 5 in order named, and flows into each cylinder 9. The amount of air inflow is regulated by an electronic throttle 3.

A spark plug 8 and a fuel injection valve 7 are mounted on each cylinder 9. Further, each cylinder 9 is provided with an intake valve 27 and an exhaust valve 28. The employed exhaust system is such that an exhaust manifold 10 is connected to each cylinder 10. A three-way catalyst 11 is mounted on the exhaust manifold 10. Further, an A/F sensor 12 is mounted between each cylinder 9 and the three-way catalyst 11.

An exhaust gas re-circulation path (EGR path) 18 is furnished to establish communication between the intake manifold 4 and exhaust manifold 10 by bypassing each cylinder 9. The EGR path is provided with an EGR valve 19.

The intake manifold 4 for the intake system is provided with an air flow sensor 2. The air flow sensor detects the amount of air inflow. A crank angle sensor 15 outputs a signal each time a crankshaft rotates one degree. A throttle opening sensor 17, which is mounted on an electronic throttle 3, detects the opening of the electronic throttle 3. A water temperature sensor 14 detects a cooling water temperature of the internal combustion engine 20. An accelerator opening sensor 13 detects the depression amount of an accelerator 6 for the purpose of detecting a torque demanded by the driver.

The signals output from the accelerator opening sensor 13, air flow sensor 2, throttle opening sensor 17, crank angle sensor 15, and water temperature sensor 14 are transmitted to a control unit (controller) 50. The information about the operating status of the internal combustion engine 20 is derived from the signals output from these sensors to optimally compute major manipulated variables of the internal combustion engine, such as the intake air volume, fuel injection quantity, and ignition timing. The fuel injection quantity computed within the control unit 50 is converted to a valve open pulse signal and forwarded to the fuel injection valve 7.

Further, the control unit 50 computes an ignition time as specified. To ensure that ignition takes place at the computed ignition time, the control unit 50 outputs a drive signal to the spark plug 8. The intake air delivered from the intake system is regulated by the electronic throttle 3, mixed with a re-circulated exhaust gas that is regulated by the EGR valve 19, and admitted into the cylinder 9 via the intake valve 27.

The fuel injected from the fuel injection valve 7 into the cylinder (combustion chamber) 9 is mixed with an air inflow from the intake manifold 4 to form an air-fuel mixture. The air-fuel mixture is combustively burned by a spark that is generated from the spark plug 8 at the computed ignition time. The resulting combustion pressure pushes a piston 29 downward so as to generate motive power for the internal combustion engine 20. The exhaust gas generated upon combustion goes into the three-way catalyst 11 via the exhaust manifold 10. All exhaust gas components (HC, CO, and NOx) are then purified in the three-way catalyst 11 and discharged again to the outside.

The amount of exhaust gas re-circulated to the intake side via an exhaust gas re-circulation pipe 18 is regulated by the EGR valve 19. The A/F sensor 12 has a linear output characteristic in relation to the concentration of oxygen contained in the exhaust gas. The relationship between the concentration of oxygen in the exhaust gas and the air-fuel ratio is substantially linear. Therefore, the A/F sensor 12, which detects the concentration of oxygen, can determine the air-fuel ratio of the internal combustion engine 20.

The control unit 50 is configured so as to use the signal from the A/F sensor 12 to calculate the upstream air-fuel ratio of the three-way catalyst 11, and exercise feedback control to successively correct the fuel injection quantity or air flow rate for the purpose of ensuring that the air-fuel ratio of an air-fuel mixture in the cylinder 9 for the internal combustion engine 20 agrees with a target air-fuel ratio.

Figure 2:
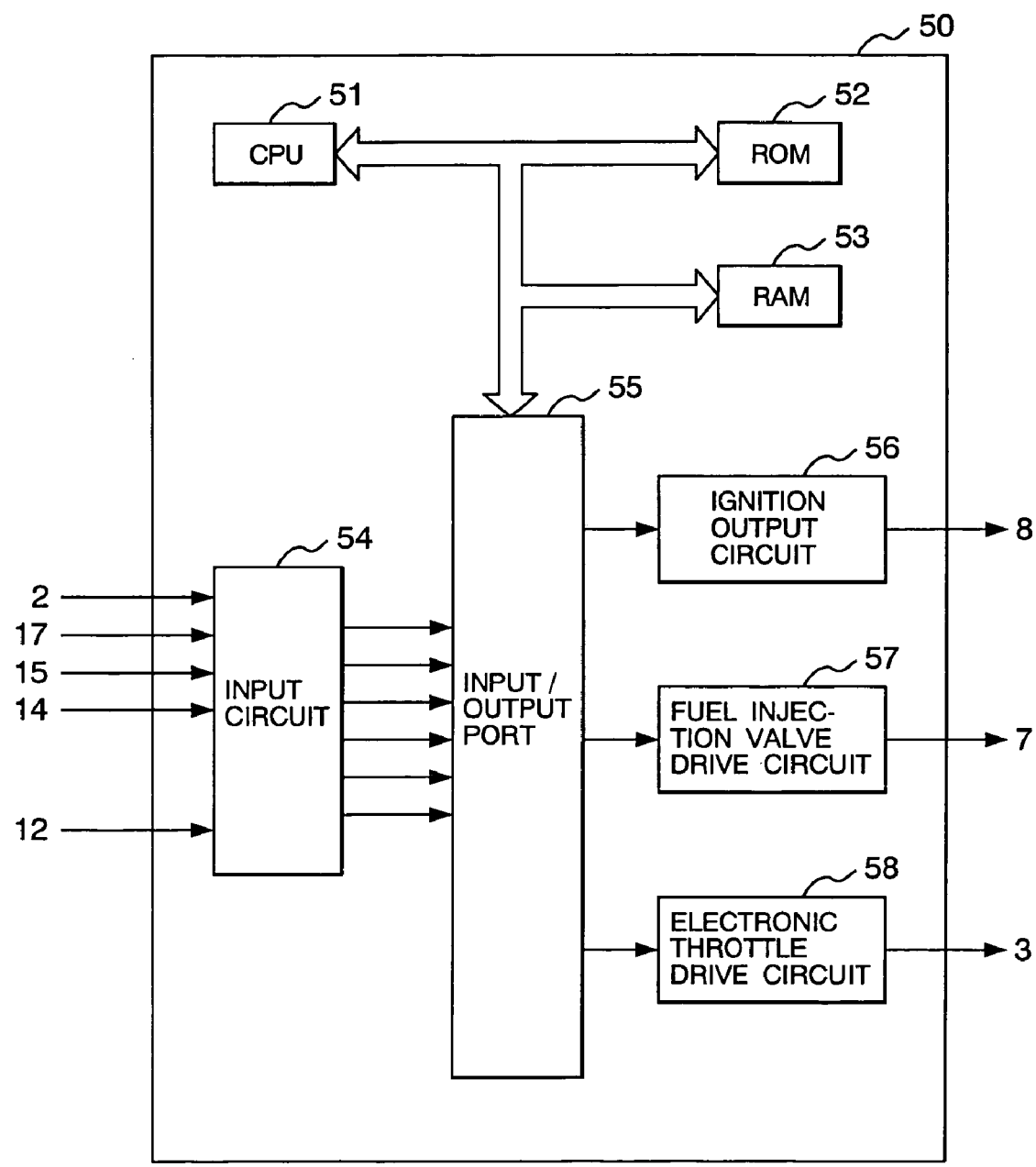
FIG. 2 illustrates the internal configuration of an internal combustion engine controller shown in FIG. 1.

FIG. 2 illustrates the internal configuration of the control unit (ECU) 50 for the internal combustion engine 20 shown in FIG. 1. The values output from the A/F sensor 12, throttle opening sensor 17, air flow sensor 2, internal combustion engine rotating speed sensor 15, and water temperature sensor 14 enter the ECU 50. The output values are then subjected to noise elimination and other signal processes in an input circuit 54, and forwarded to an input/output port 55. The value of the input/output port 55 is stored in a RAM 53 and subjected to arithmetic processing by a CPU 51. A control program containing the description of arithmetic processing is stored in a ROM 52 beforehand.

The values representing the amounts of individual actuator operations, which are computed by the control program, are stored in the RAM 53 and then forwarded to the input/output port 55. An ON/OFF signal is set as the operation signal for the spark plug 8, which is used for ignition and combustion. This signal is ON when the primary coil in an ignition output circuit 56 is energized and OFF when the same circuit is de-energized. Ignition takes place when the signal status changes from ON to OFF. A spark plug signal, which is set for the input/output port 55, is amplified to energy adequate for combustion and then supplied to the spark plug 8. As a drive signal for the fuel injection valve 7, an ON/OFF signal is set. This signal turns ON to open the valve and turns OFF to close the valve. The signal is amplified to an adequate energy level that is required for operating the fuel injection valve drive circuit 57 to open the fuel injection valve 7, and then forwarded to the fuel injection valve 7.

A drive signal for opening the electronic throttle 3 to a target degree of opening is delivered to the electronic throttle 3 via an electronic throttle drive circuit 58.

The configuration common to all embodiments of an internal combustion engine controller according to the present invention has been described. From now on, individual embodiments will be described.

First Embodiment

The control program to be written into the ROM 52 of the EPU 50 will now be described.

Figure 3:
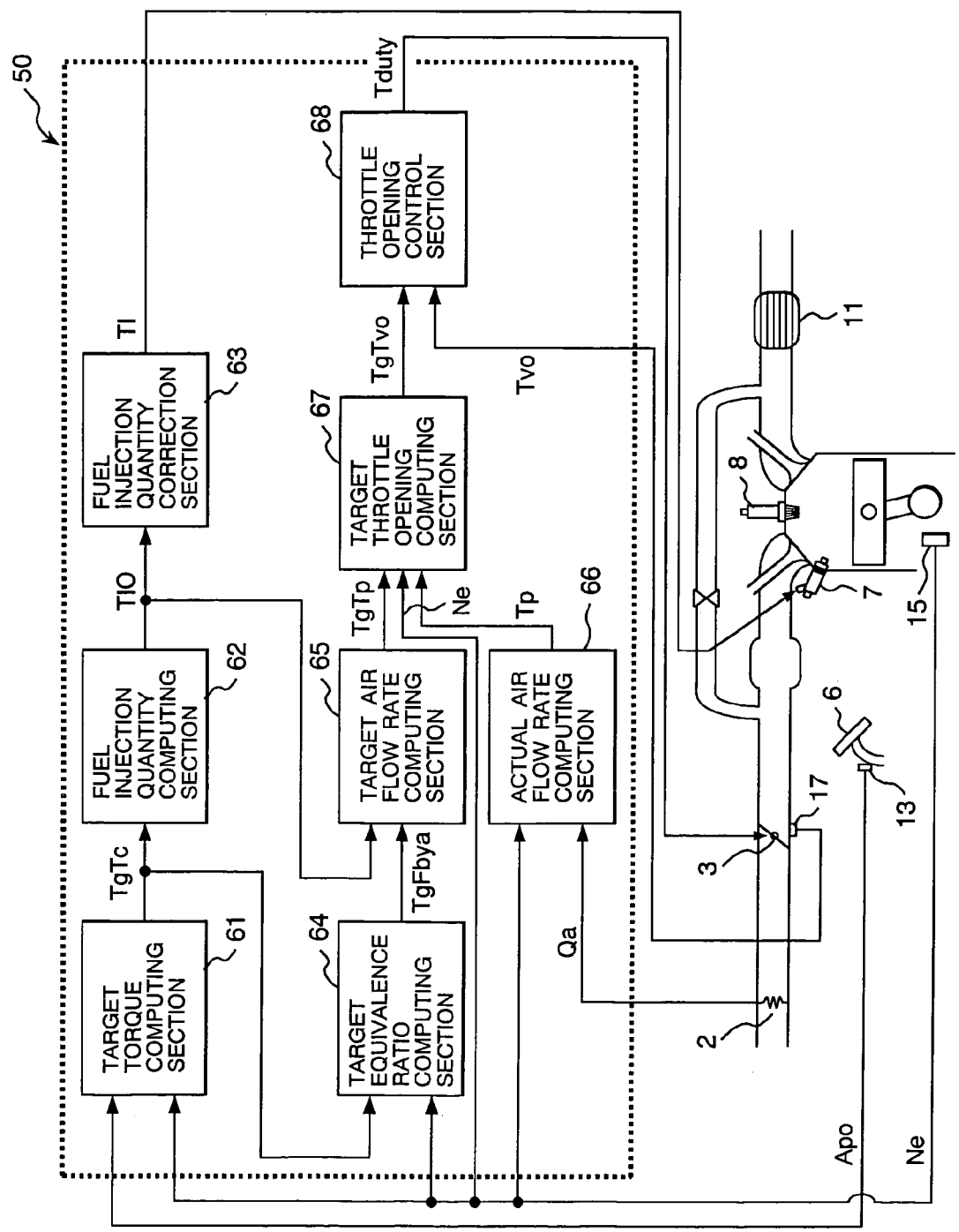
FIG. 3 is a control block diagram that illustrates a first embodiment of an internal combustion engine controller according to the present invention.

FIG. 3 is a control block diagram illustrating the overall control operation that the EPU 50 shown in FIG. 2 performs in accordance with a first embodiment. The major portion of a fuel-based, torque-on-demand control is shown in FIG. 3.

This control comprises a target torque computing section 61, a fuel injection quantity computing section 62, a fuel injection quantity correction section 63, a target equivalence ratio computing section 64, a target air flow rate computing section 65, an actual air flow rate computing section 66, a target throttle opening computing section 67, and a throttle opening control section 68.

The target torque computing section 61 computes a target torque TgTc from an accelerator opening Apo and an internal computer combustion engine rotating speed Ne. The fuel injection quantity computing section 62 operates based on the target torque TgTc to compute a fuel injection quantity TIO that provides the target torque TgTc. The fuel injection quantity correction section 63 provides phase compensation so that the fuel injection quantity TIO matches the phase of the air in the cylinder 9, and then computes a corrected fuel injection quantity TI.

The target equivalence ratio computing section 64 computes a target equivalence ratio TgFbya from the target torque TgTc and internal combustion engine rotating speed Ne. For the sake of convenience, the ratio between fuel and air is handled in the form of an equivalence ratio. It goes without saying that the air-fuel ratio may be used as is. It should be noted that the target equivalence ratio computing section 64 also chooses between homogeneous combustion and stratified combustion.

The target air flow rate computing section 65 computes a target air flow rate TgTp from the fuel injection quantity TIO and target equivalence ratio TgFbya. Although this will be described in detail later, the amount of air inflow into a cylinder per cycle is standardized as a value of the target air flow rate TgTp for the sake of convenience. The actual air flow rate computing section 66 converts a mass flow rate Qa detected by the air flow sensor 2 into an actual air flow rate Tp, which is of the same dimension as the target air flow rate TgTP and flows into a cylinder per cycle, and then outputs the converted value.

The target throttle opening computing section 67 computes a target throttle opening TgTvo in accordance with the target air flow rate TgTp and actual air flow rate Tp. The throttle opening computing section 68 computes a throttle manipulated variable Tduty from the target throttle opening TgTvo, the actual opening of the electronic throttle 3, and the value Tvo. The throttle manipulated variable Tduty represents the duty ratio of a PWM signal that enters a drive circuit 58, which controls a throttle motor drive current.

The control computing sections and correction sections of the first embodiment of the control block described above will now be described in detail with reference to FIGS. 4 to 12.

1. Target Torque Computing Section

Figure 4:
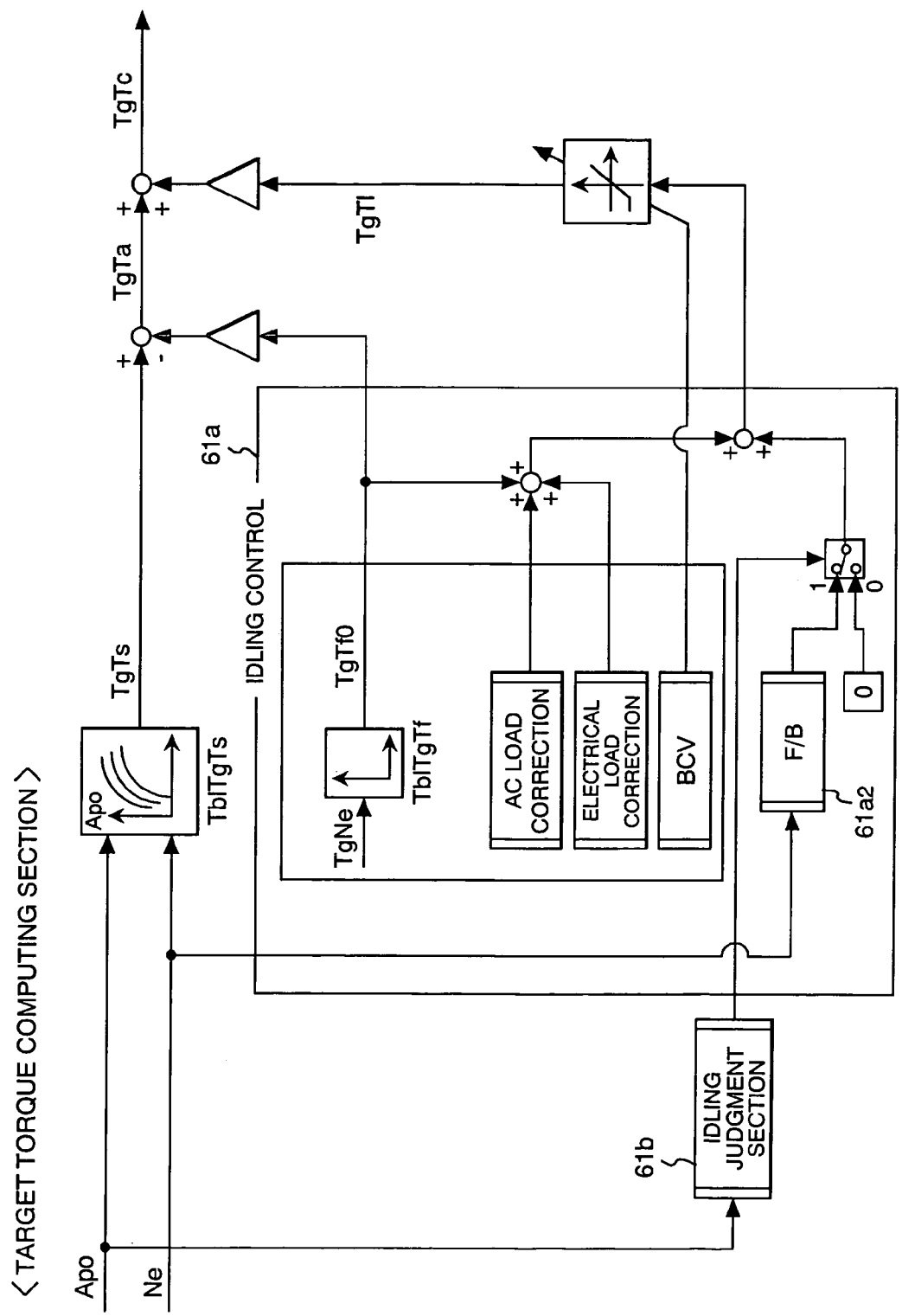
FIG. 4 is a block diagram that illustrates a target torque computing section shown in the control block diagram in FIG. 3.

FIG. 4 illustrates the target torque computing section 61. The value TgTc represents a torque that is equivalent to a target combustion pressure. The value TgTa represents a torque required by the accelerator. The value TgTl represents an air flow rate that is required for idling speed maintenance.

Since an off-idle state provides torque control and an idle state provides output control, it is assumed that the manipulated variable of an idling control means 61a is a theoretical air-fuel ratio, which is proportional to the output. Gain is provided for use in output-to-torque dimensional conversion. Further, when the air-conditioner (AC) is ON, the corresponding load is corrected. If any electrical load exists, the corresponding load is corrected. For the air flow rate required for idling speed maintenance TgTl, a lower-limit value is defined as a BCV portion for assuring an adequate air flow rate for avoiding a reverse oil flow into the cylinder 6.

An idle feedback control means 61a2 functions during an idle state only in order to correct feed-forward-related error. It is assumed that the controlled variable for the idle feedback control means 61a2 is the rotating speed Ne, and that the manipulated variable is an air flow rate. The algorithm for the idle feedback control means 61a2 is not specified herein. However, it may be, for instance, a PID control algorithm.

An idling judgment section 61b concludes that an idle state exists when the accelerator opening Apo is smaller that specified. It is desirable that the TblTgTa and TblTgTf settings be determined according to actual device data.

2. Fuel Injection Quantity Computing Section

Figure 5:
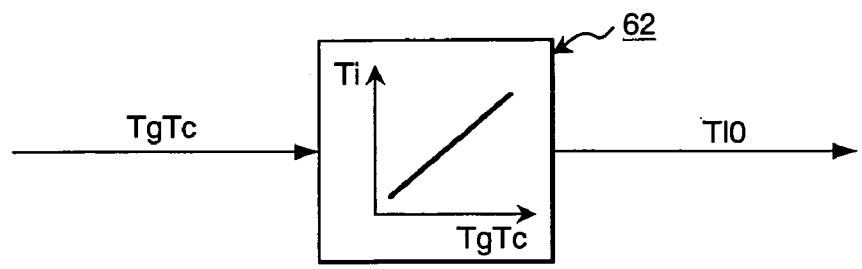
FIG. 5 is a block diagram that illustrates a fuel injection quantity computing section shown in the control block diagram in FIG. 3.

FIG. 5 illustrates the fuel injection quantity computing section 62, which converts a target combustion pressure torque TgTc to a fuel injection quantity TIO for control purposes. The fuel injection quantity TIO is proportional to torque because it represents a fuel injection quantity per cylinder per cycle. This proportional relationship is used to convert the target combustion pressure torque TgTc to the fuel injection quantity TIO. A gain may be used, but table conversion may be effected in consideration of some possible error. It is desirable that the setting be determined according to actual device data.

3. Fuel Injection Quantity Correction Section

Figure 6:
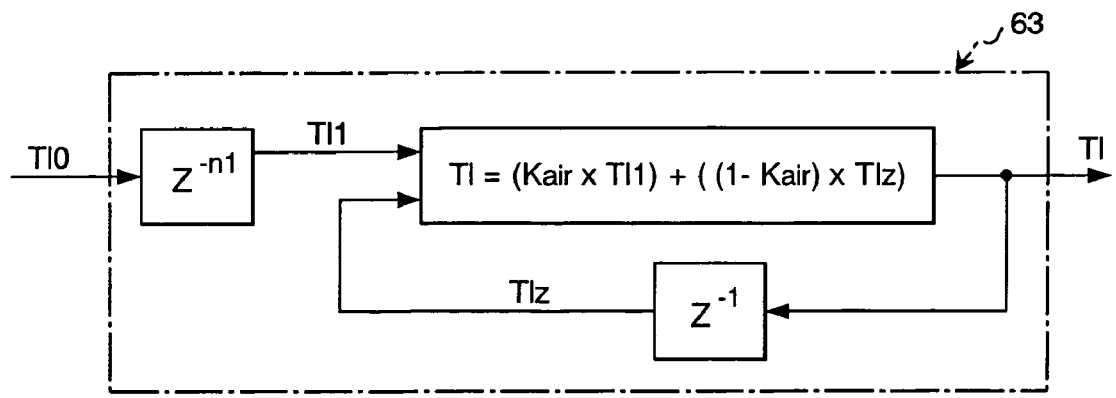
FIG. 6 is a block diagram that illustrates a fuel injection quantity correction section shown in the control block diagram in FIG. 3.

FIG. 6 illustrates the fuel injection quantity correction section 63, which provides correction to adjust the fuel injection quantity TIO for the phase of the air in the cylinder 9. The air transmission characteristic between the throttle 3 and cylinder 9 is approximated with wasted time plus first-order lag. It is desirable that the settings for parameter n1, which represents wasted time, and parameter Kair, which corresponds to a time constant for a first-order lag, be determined according to actual device data. Further, parameter n1 and parameter Kair may be varied depending on the operating conditions.

4. Target Equivalence Ratio Computing Section

Figure 7:
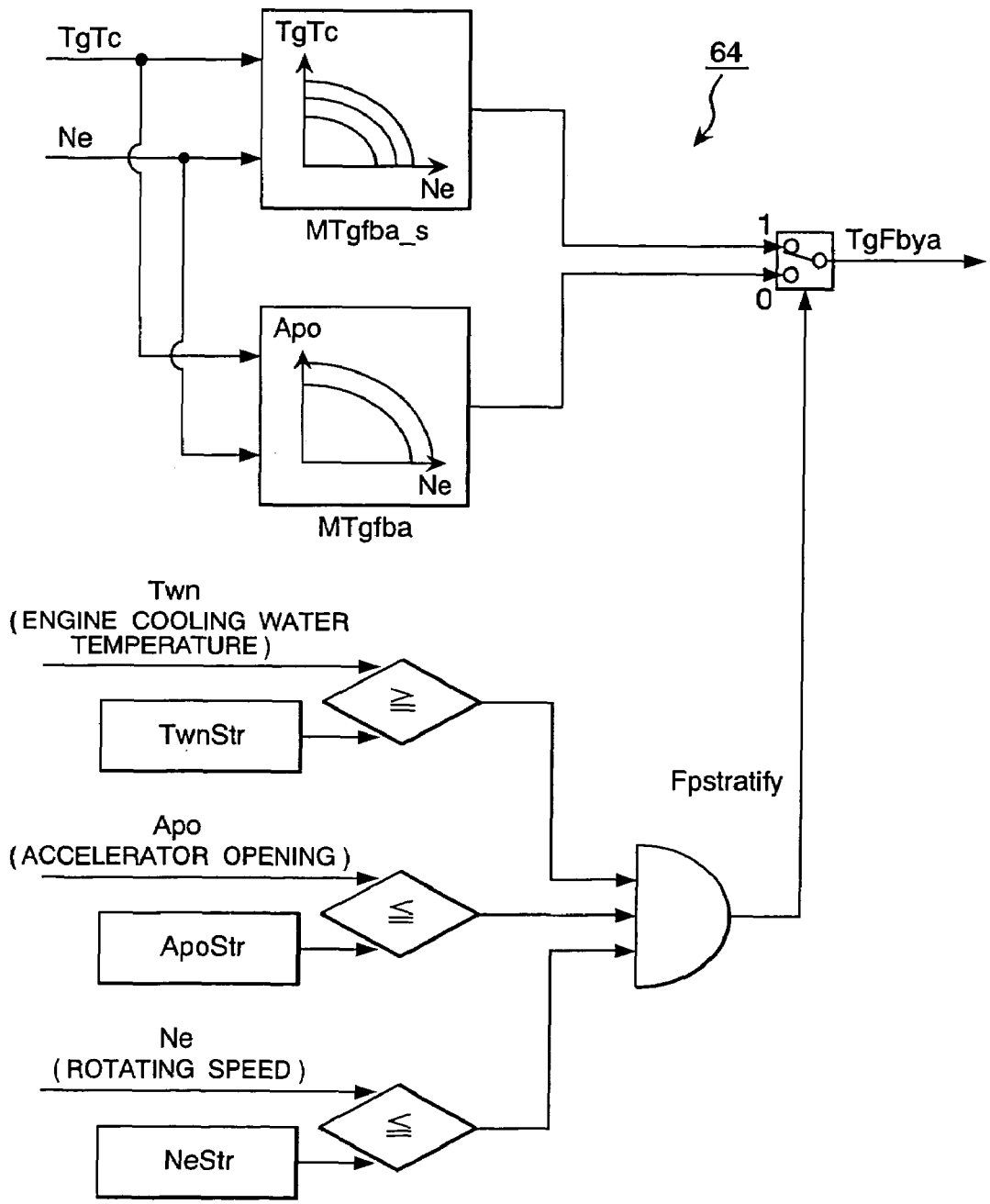
FIG. 7 is a block diagram that illustrates a target equivalence ratio computing section shown in the control block diagram in FIG. 3.

FIG. 7 illustrates the target equivalence ratio computing section 64, which determines the combustion status and computes the target equivalence ratio. Fpstratify is a stratified combustion permission flag. When Fpstratify=1, the injection time, ignition time, injection quantity, and air flow rate are regulated to provide stratified combustion. Injection time/ignition time determination is not described herein. The stratified combustion permission flag Fpstratify is 1 to permit stratified combustion if the conditions are satisfied by the water temperature Twn, accelerator opening Apo, and rotating speed Ne. When stratified combustion is permitted, the value for letting a stratified combustion target equivalence ratio map Mtgfba_s be referenced by the target combustion pressure torque TgTc and rotating speed Ne is the target equivalence ratio TgFbya. When TgFbya=0, homogeneous combustion takes place, and the value for letting a homogeneous combustion target equivalence ratio map Mtgfba be referenced by the target combustion pressure TgTc and rotating speed Ne is the target equivalence ratio TgFbya. It is desirable that the settings for the stratified combustion target equivalence ratio map Mtgfba_s and homogeneous combustion target equivalence ratio map Mtgfba be determined according to actual device data.

5. Target Air Flow Rate Computing Section

Figure 8:
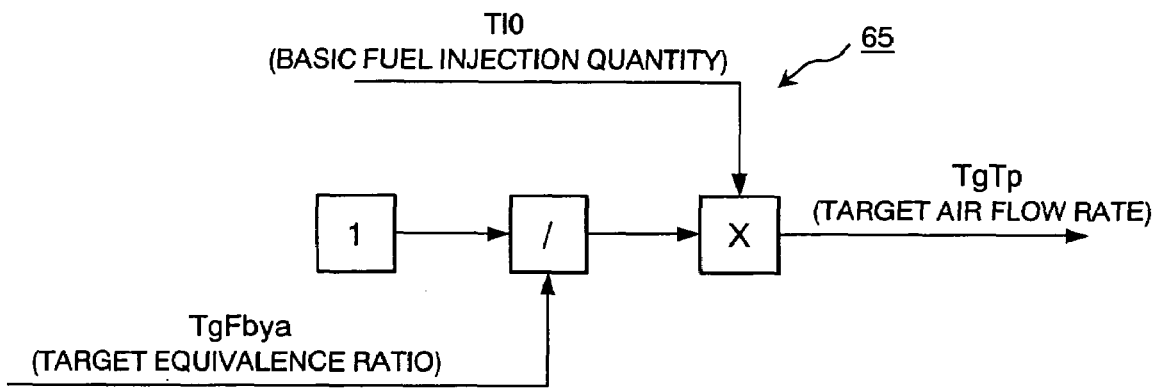
FIG. 8 is a block diagram that illustrates a target air flow rate computing section shown in the control block diagram in FIG. 3.

FIG. 8 illustrates the target air flow rate computing section 65, which computes the target air flow rate TgTp. For the sake of convenience, the target air flow rate TgTp is computed as a standardized value representing the air flow rate that flows into a cylinder per cycle. As is obvious from FIG. 8, the target air flow rate TgTp is calculated from the fuel injection quantity TIO and target equivalence ratio TgFbya. The equation used for this calculation is as follows:

$$TgTp=TIO\times(1/TgFbya)$$

6. Actual Air Flow Rate Computing Section

Figure 9:
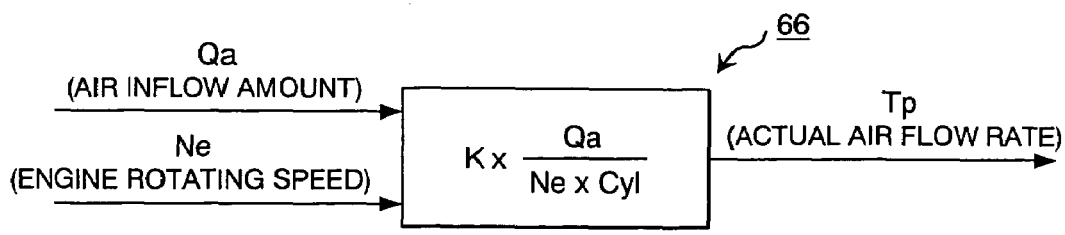
FIG. 9 is a block diagram that illustrates an actual air flow rate computing section shown in the control block diagram in FIG. 3.

FIG. 9 illustrates the actual air flow rate computing section 66, which computes the actual air flow rate Tp. For the sake of convenience, the actual air flow rate Tp is computed as a standardized value representing the air flow rate that flows into a cylinder per cycle. The value Qa is an incoming air flow rate that is detected by the air flow sensor 2. The value K is determined so that the actual air flow rate Tp provides the fuel injection quantity prevalent at the theoretical air-fuel ratio. The value Cyl denotes the number of cylinders for the internal combustion engine 20.

7. Target Throttle Opening Computing Section

Figure 10:
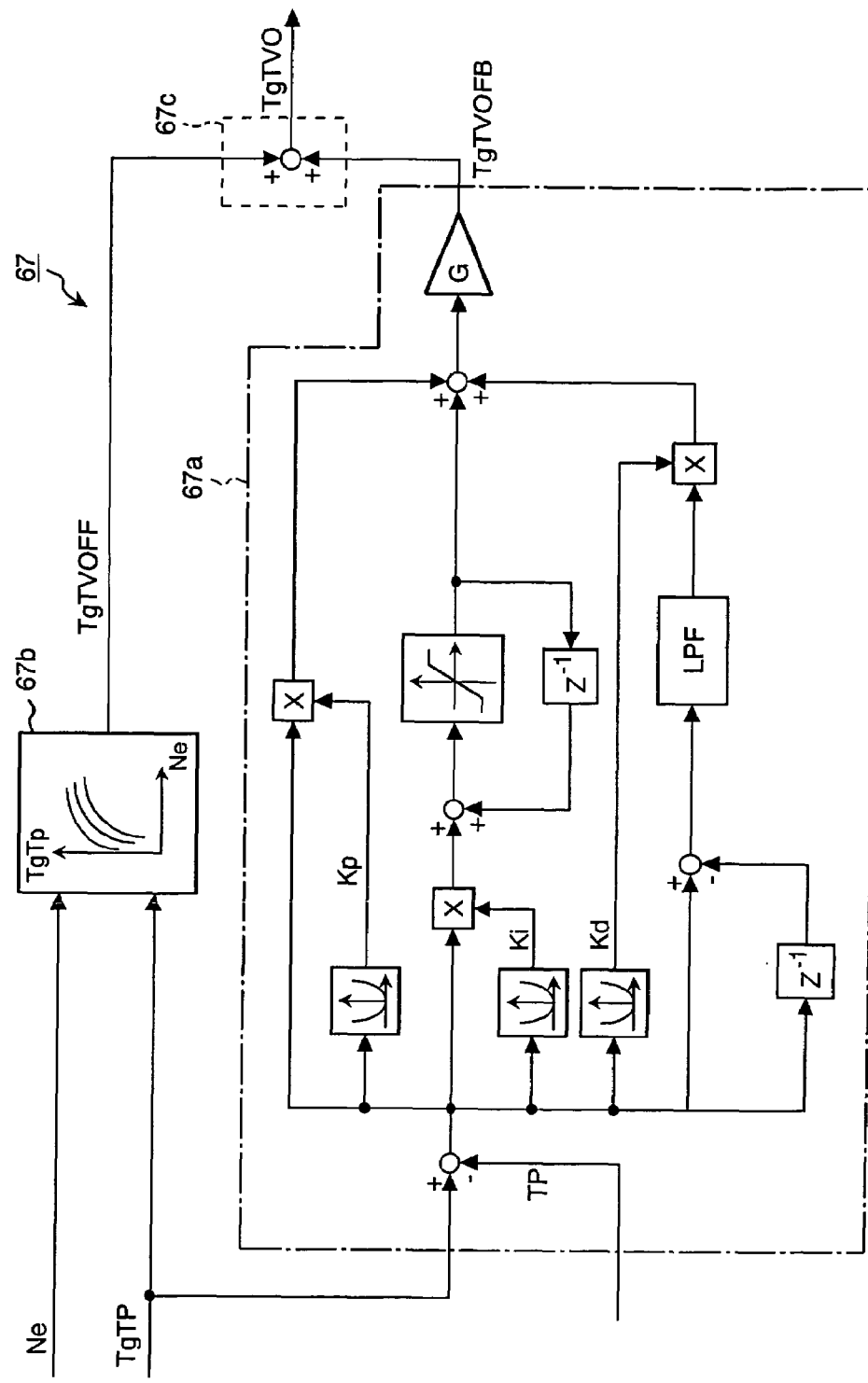
FIG. 10 is a block diagram that illustrates a target throttle opening computing section shown in the control block diagram in FIG. 3.

FIG. 10 illustrates the target throttle opening computing section 67, which determines the target throttle opening TgTVO from the target air flow rate TgTp, actual air flow rate Tp, and rotating speed Ne. This control block can be divided into a section 67b (second target throttle opening computing means) for exercising feed-forward control to determine the target throttle opening TgTVOFF from the target air flow rate TgTp and rotating speed Ne and a feedback control section 67a (first target throttle opening computing means) for exercising feedback control to determine the target throttle opening TgTVOFB from the target air flow rate TgTp and actual air flow rate Tp. It is assumed, as shown in FIG. 10, that the feed-forward control section 67b determines the target throttle opening TgTVOFF by referencing a map. It is desirable that the map setting be determined according to actual device data.

Feedback control is exercised to provide PID control. Each gain is given as a magnitude of deviation between the target air flow rate TgTp and actual air flow rate TpTg. However, it is desirable that the setting be determined according to actual device data. For the D portion, an LPF (low-pass filter) is provided for high-frequency noise elimination.

The target throttle opening TgTVOFF that is computed by the second section 67b of feed-forward control, and the target throttle opening TgTVOFB that is determined by the first section 67a of feedback control are output to the third control section 67c (third throttle opening computing means). The third control section 67c then computes the sum of the target throttle opening TgTVOFF and target throttle opening TgTVOFB and uses the computed sum as the final target throttle opening TgTVO.

8. Throttle Opening Control Section

Figure 11:
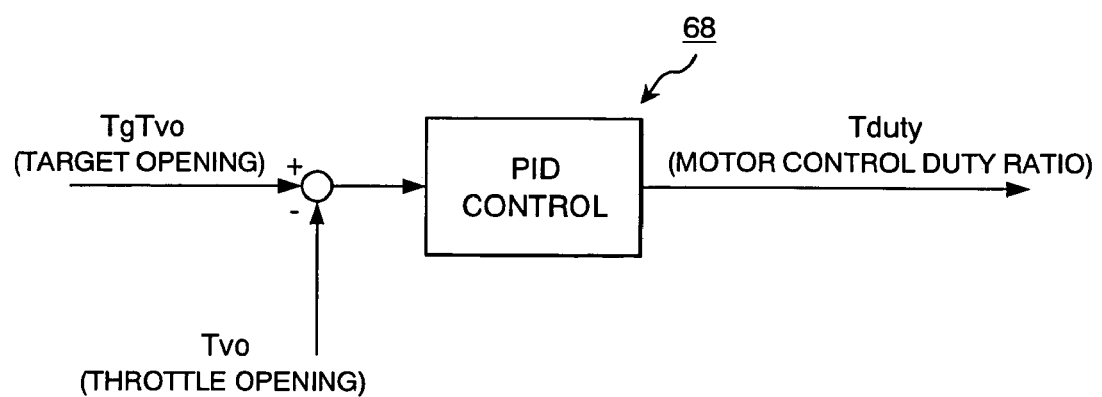
FIG. 11 is a block diagram that illustrates a throttle opening control section for the target throttle opening computing section shown in FIG. 10.

FIG. 11 illustrates the throttle opening control section 68, which computes the throttle drive manipulated variable Tduty from the target throttle opening TgTVO and actual throttle opening Tvo. As described earlier, the throttle drive manipulated variable Tduty denotes the duty ratio of a PWM signal that enters a drive circuit 58, which controls a throttle motor drive current. It is assumed that the throttle drive manipulated variable Tduty is determined by means of PID control. Although no details will be given, it is desirable that each PID control gain be tuned with an actual device for optimum results.

Second Embodiment

Figure 12:
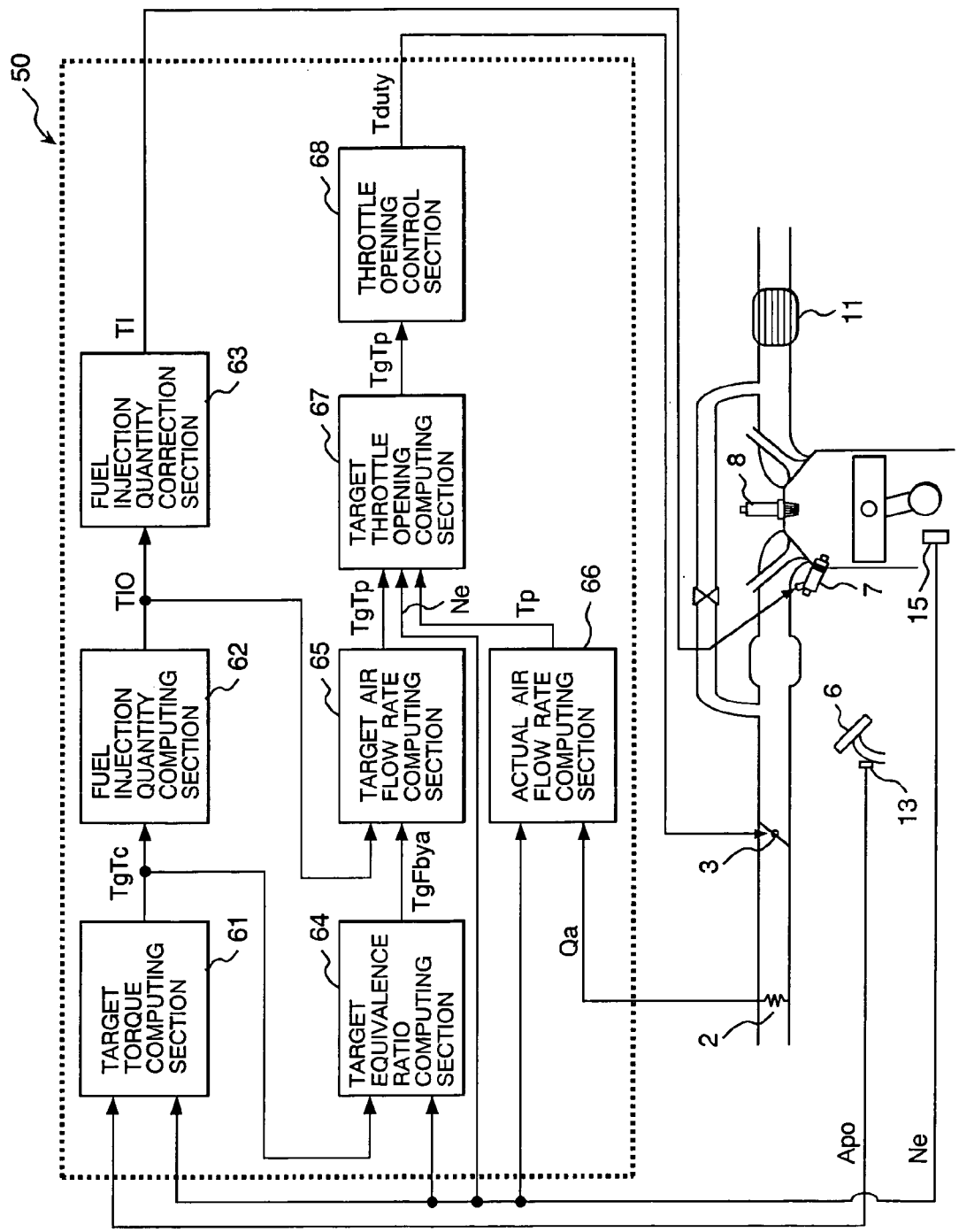
FIG. 12 is a control block diagram that illustrates an internal combustion engine controller according to a second embodiment of the present invention.

The control block of an internal combustion engine controller according to a second embodiment of the present invention will now be described in detail. FIG. 12 is a control block diagram of the second embodiment that illustrates the overall control of the EPU 50 shown in FIG. 2. The major portion of a fuel-based, torque-on-demand control is shown in FIG. 12.

The target torque computing section 61, fuel injection quantity computing section 62, fuel injection quantity correction section 63, target equivalence ratio computing section 64, target air flow rate computing section 65, actual air flow rate computing section 66, and target throttle opening computing section 67 within the control block of the second embodiment are the same as their counterparts described in Sections 1 to 7, respectively, under the first embodiment and will not be described again.

8. Throttle Opening Control Section

Figure 13:
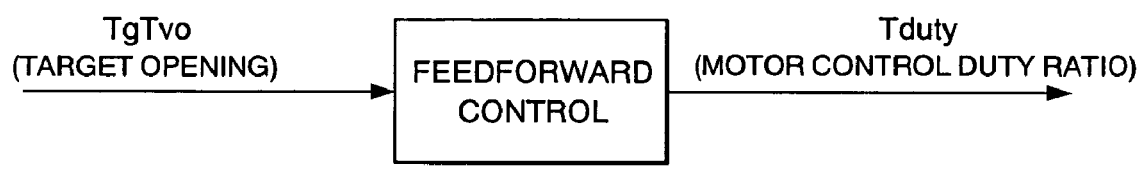
FIG. 13 is a control block diagram that illustrates a throttle opening computing section shown in the control block diagram in FIG. 12.

FIG. 13 illustrates the throttle opening control section 68. As indicated in FIG. 13, feed-forward control is exercised to determine the throttle drive manipulated variable Tduty from the target throttle opening TgTVO only.

The feed-forward control portion may be a gain only. In such an instance, however, the manipulated variable (Tduty) for throttle opening control is computed directly from a target air flow rate TgTp without computing a target throttle opening.

Third Embodiment

The control block of an internal combustion engine controller according to a third embodiment of the present invention will now be described in detail. The control block of the third embodiment differs from that of the first embodiment, which is shown in FIG. 3, in that the target air flow rate TgTp for use in feedback control is filtered in relation to a feed-forward control target value in the target throttle opening computing section 67. The filter characteristic will be described in detail later. However, it is a response characteristic between the target throttle opening and in-cylinder actual air flow rate that is computed by means of feed-forward control in the target air flow rate computing section 65. The purpose is to exercise feedback control to compensate for the steady-state deviation.

The target torque computing section 61, fuel injection quantity computing section 62, fuel injection quantity correction section 63, target equivalence ratio computing section 64, target air flow rate computing section 65, actual air flow rate computing section 66, and throttle opening control section within the control block of the third embodiment are the same as their counterparts described in Sections 1 to 6 and 8, respectively, under the first embodiment and will not be described again.

7. Target Throttle Opening Computing Section

Figure 14:
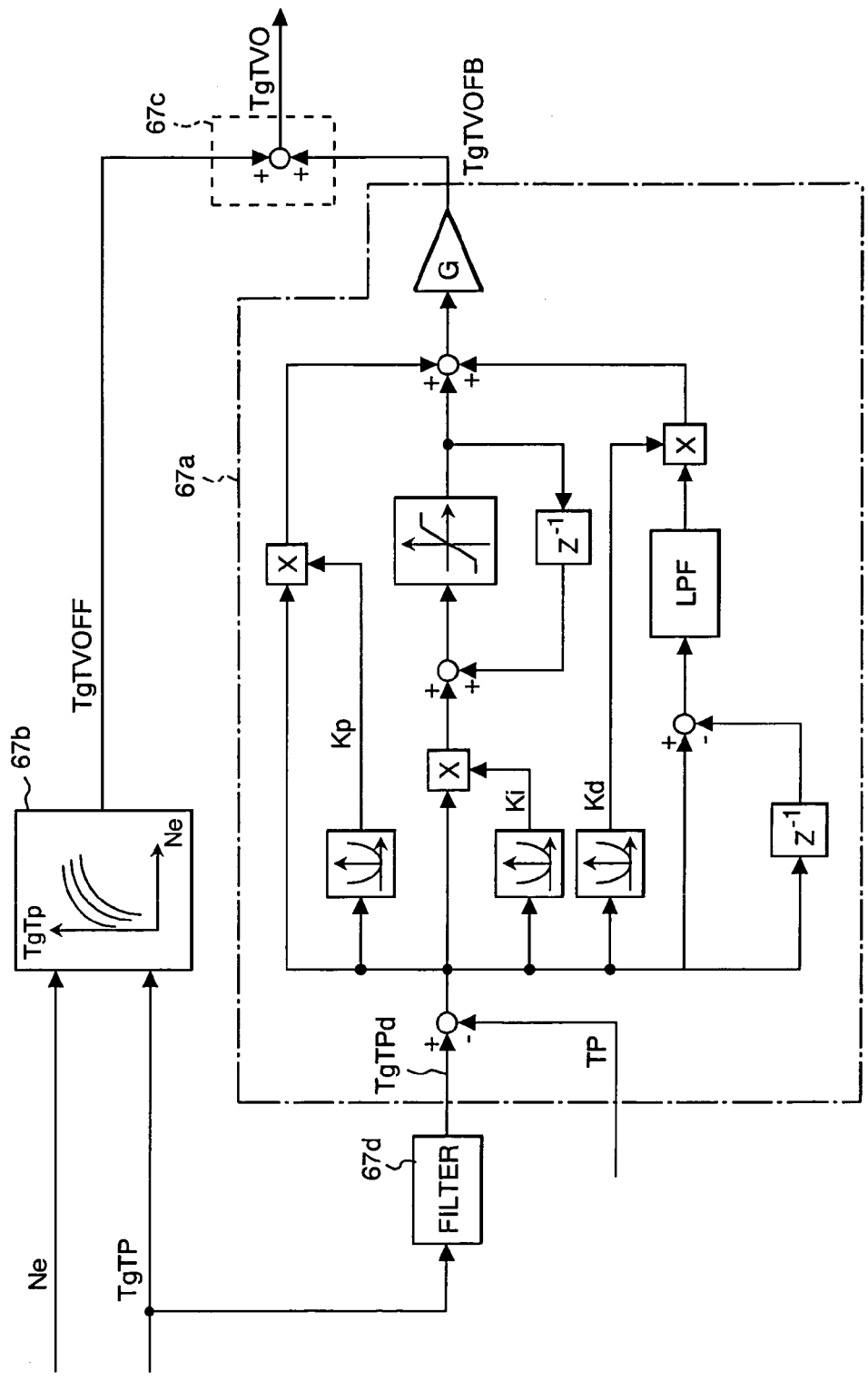
FIG. 14 is a control block diagram that illustrates a target throttle opening computing section of an internal combustion engine controller according to a third embodiment of the present invention.
Figure 15:
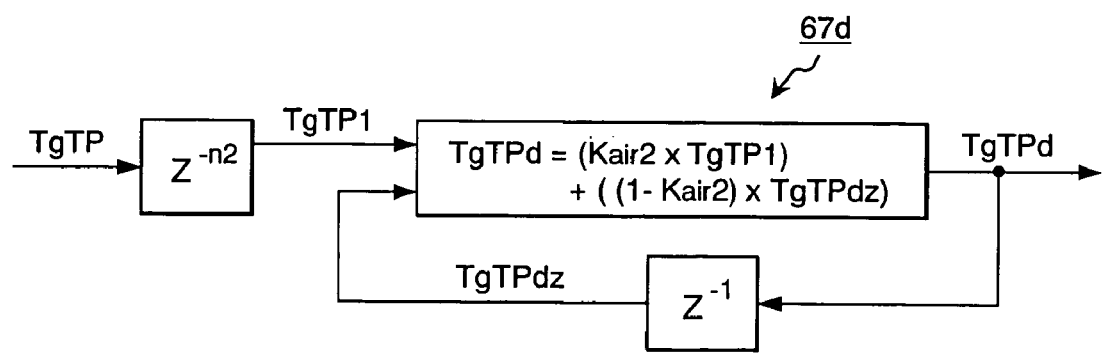
FIG. 15 is a control block diagram that illustrates a feedback control target value filter for the target throttle opening computing section shown in FIG. 14.

As shown in FIG. 14, the target air flow rate TgTp for feedback control is a value that is obtained by filtering the target air flow rate TgTp with a filter 67d. As indicated in FIG. 15, the specifications for the filter 67c are such that the air transmission characteristic between the throttle 3 and cylinder 9 is approximated with wasted time plus first-order lag. It is desirable that the settings for parameter n2, which represents wasted time, and parameter Kair2, which corresponds to a time constant for a first-order lag, be determined according to actual device data. Further, the parameter n2 and the parameter Kair2 may be varied depending on the operating conditions.

Fourth Embodiment

The control block of an internal combustion engine controller according to a fourth embodiment of the present invention will now be described in detail. The control block of the fourth embodiment differs from that of the first embodiment, which is shown in FIG. 3, in that the feedback control's computation of target throttle opening TgTVO can be permitted depending on the operating conditions in the target throttle opening computing section 67.

The target torque computing section 61, fuel injection quantity computing section 62, fuel injection quantity correction section 63, target equivalence ratio computing section 64, target air flow rate computing section 65, actual air flow rate computing section 66, and throttle opening control section within the control block of the fourth embodiment are the same as their counterparts described in Sections 1 to 6 and 8, respectively, under the first embodiment and will not be described again.

7. Target Throttle Opening Computing Section

Figure 16:
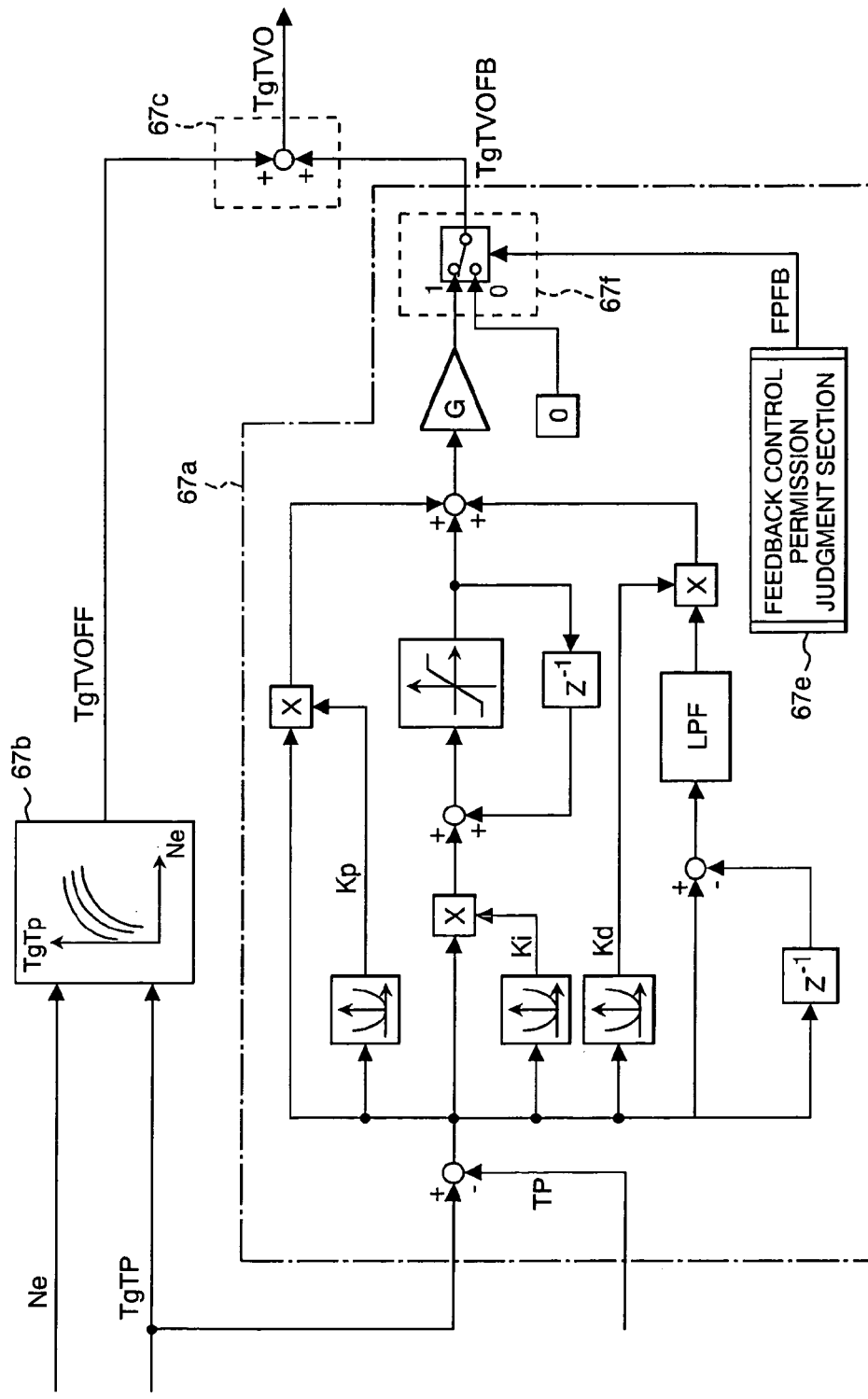
FIG. 16 is a control block diagram that illustrates a target throttle opening computing section of an internal combustion engine controller according to a fourth embodiment of the present invention.
Figure 17:
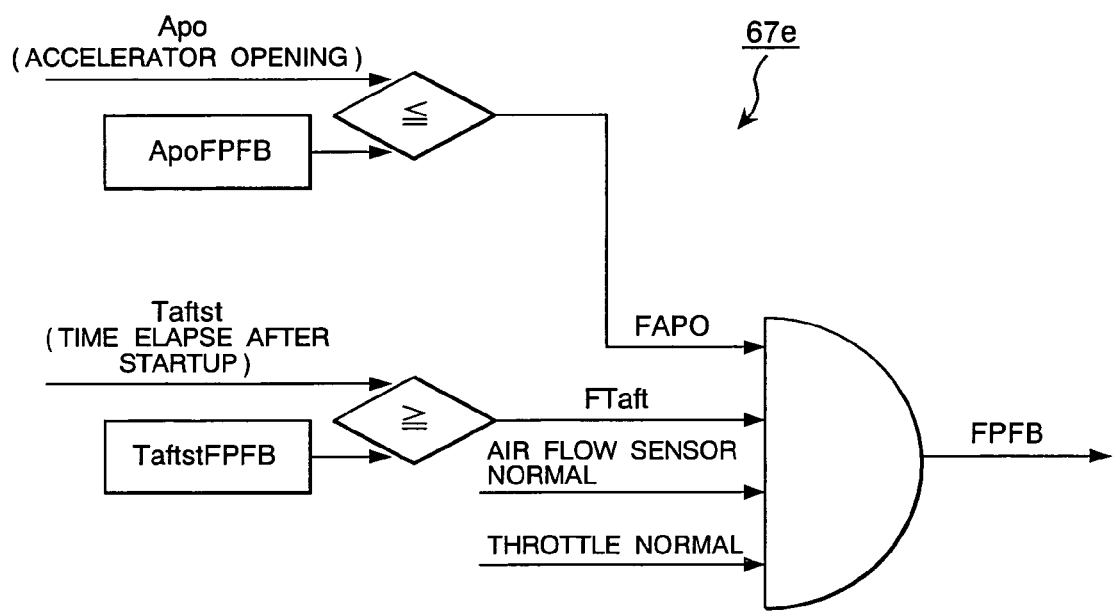
FIG. 17 is a block diagram that illustrates a feedback control permission judgment section for the target throttle opening computing section shown in FIG. 16.

When the feedback control computation permission flag FPFB is 1 in the feedback control permission judgment section 67e, a selector section 67f effects a changeover, as shown in FIG. 16, so that the target throttle opening TgTVOFB is determined by means of feedback control. When the feedback control computation permission flag FPFB is 0, on the other hand, the target throttle opening TgTVOFB is set to 0 without exercising feedback control to perform computations. As indicated in FIG. 17, the feedback control computation permission flag FPFB is established when the accelerator opening Apo and the time elapse after internal combustion engine startup Tafst are as specified and the air flow sensor and throttle are both normal. The diagnostic check methods for the air flow sensor 2 and throttle 3 are not particularly described herein; however, various practical methods are available.

Fifth Embodiment

The control block of an internal combustion engine controller according to a fifth embodiment of the present invention will now be described in detail. The control block of the fifth embodiment differs from that of the first embodiment, which is shown in FIG. 3, in that the feed-forward control's computation of target throttle opening TgTPVOFF can be permitted depending on the operating conditions in the target throttle opening computing section 67.

The target torque computing section 61, fuel injection quantity computing section 62, fuel injection quantity correction section 63, target equivalence ratio computing section 64, target air flow rate computing section 65, actual air flow rate computing section 66, and throttle opening control section within the control block of the fifth embodiment are the same as their counterparts described in Sections 1 to 6 and 8, respectively, under the first embodiment and will not be described again.

7. Target Throttle Opening Computing Section

Figure 18:
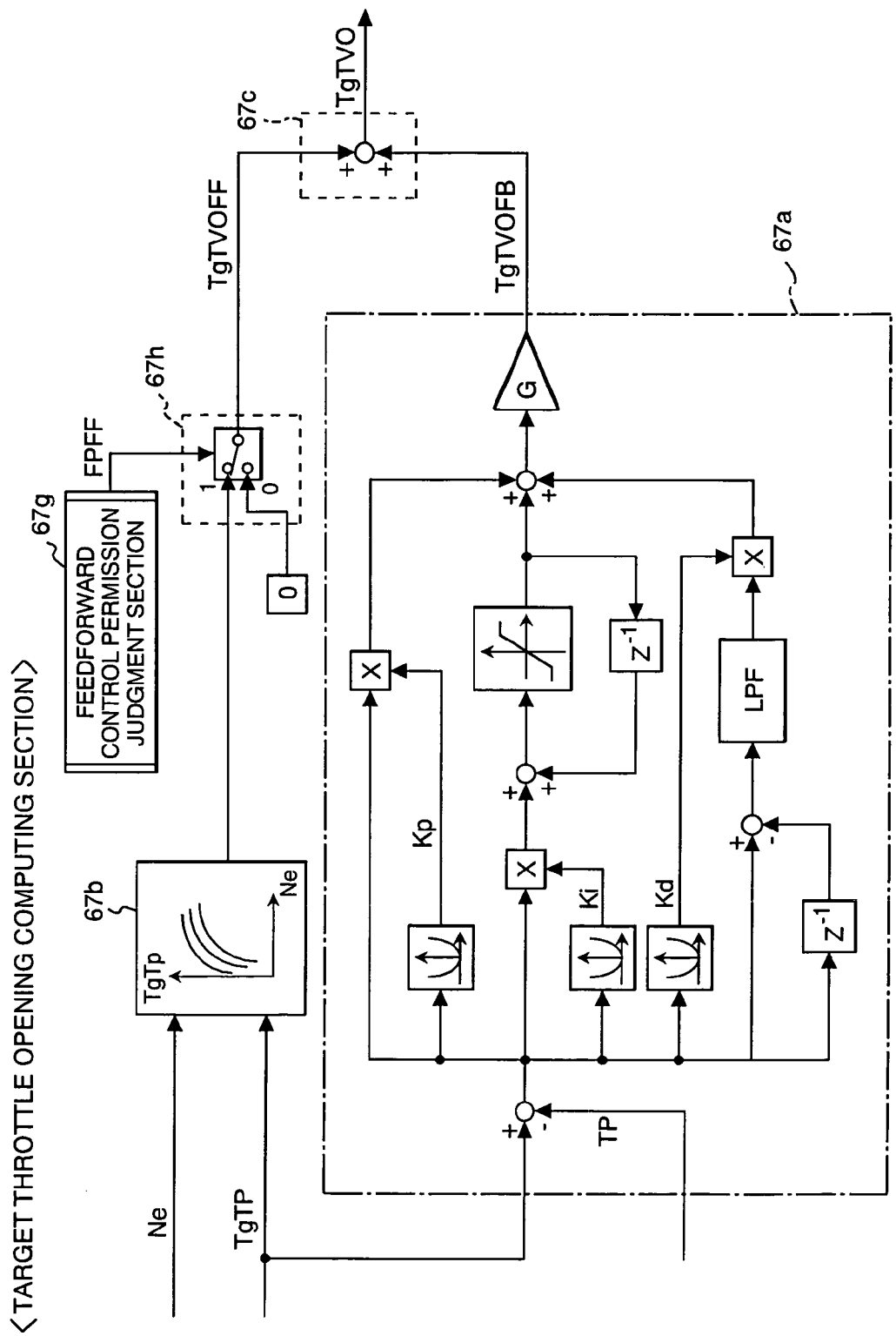
FIG. 18 is a control block diagram that illustrates a target throttle opening computing section of an internal combustion engine controller according to a fifth embodiment of the present invention.
Figure 19:
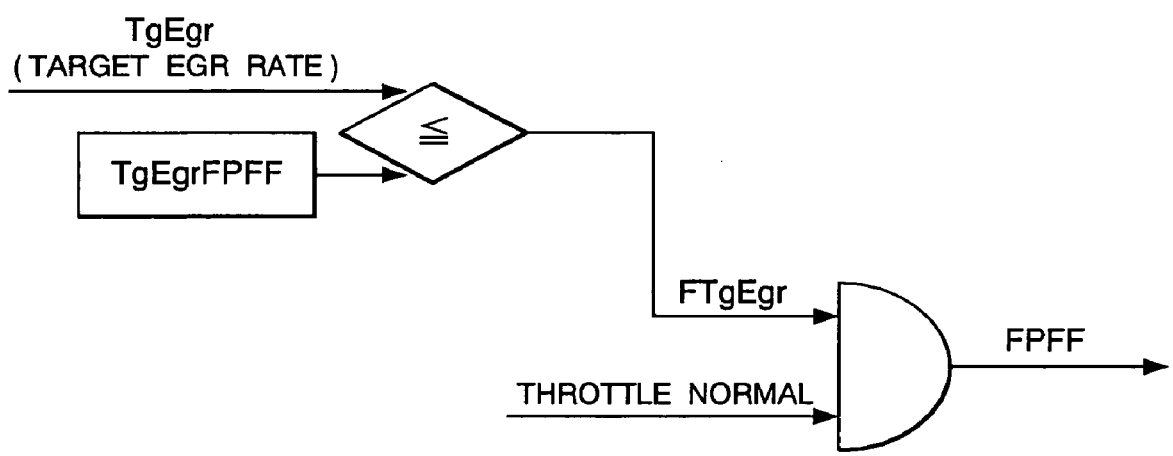
FIG. 19 is a control block diagram that illustrates a feed-forward control permission judgment section for the target throttle opening computing section shown in FIG. 18.

When the feed-forward control computation permission flag FPFB is 1 in the feed-forward control permission judgment section 67g, the target throttle opening TgTVOFF is determined by means of feed-forward control as shown in FIG. 18. When the feed-forward control computation permission flag FPFF is 0, on the other hand, the target throttle opening TgTVOFF is set to 0 without exercising feed-forward control to perform computations. As indicated in FIG. 19, the feed-forward control computation permission flag FPFF is established when the target EGR rate TgEgr is as specified and the air flow sensor is normal. The diagnostic check method for the air flow sensor is not particularly described herein.

Sixth Embodiment

The control block of an internal combustion engine controller according to a sixth embodiment of the present invention will now be described in detail. The control block of the sixth embodiment differs from that of the first embodiment, which is shown in FIG. 3, in that feed-forward control is exercised in the target throttle opening computing section 67 to compute the target throttle opening TgTVOFF while considering the exhaust gas re-circulation rate.

The target torque computing section 61, fuel injection quantity computing section 62, fuel injection quantity correction section 63, target equivalence ratio computing section 64, target air flow rate computing section 65, actual air flow rate computing section 66, and throttle opening control section within the control block of the sixth embodiment are the same as their counterparts described in Sections 1 to 6 and 8, respectively, under the first embodiment and will not be described again.

7. Target Throttle Opening Computing Section

Figure 20:
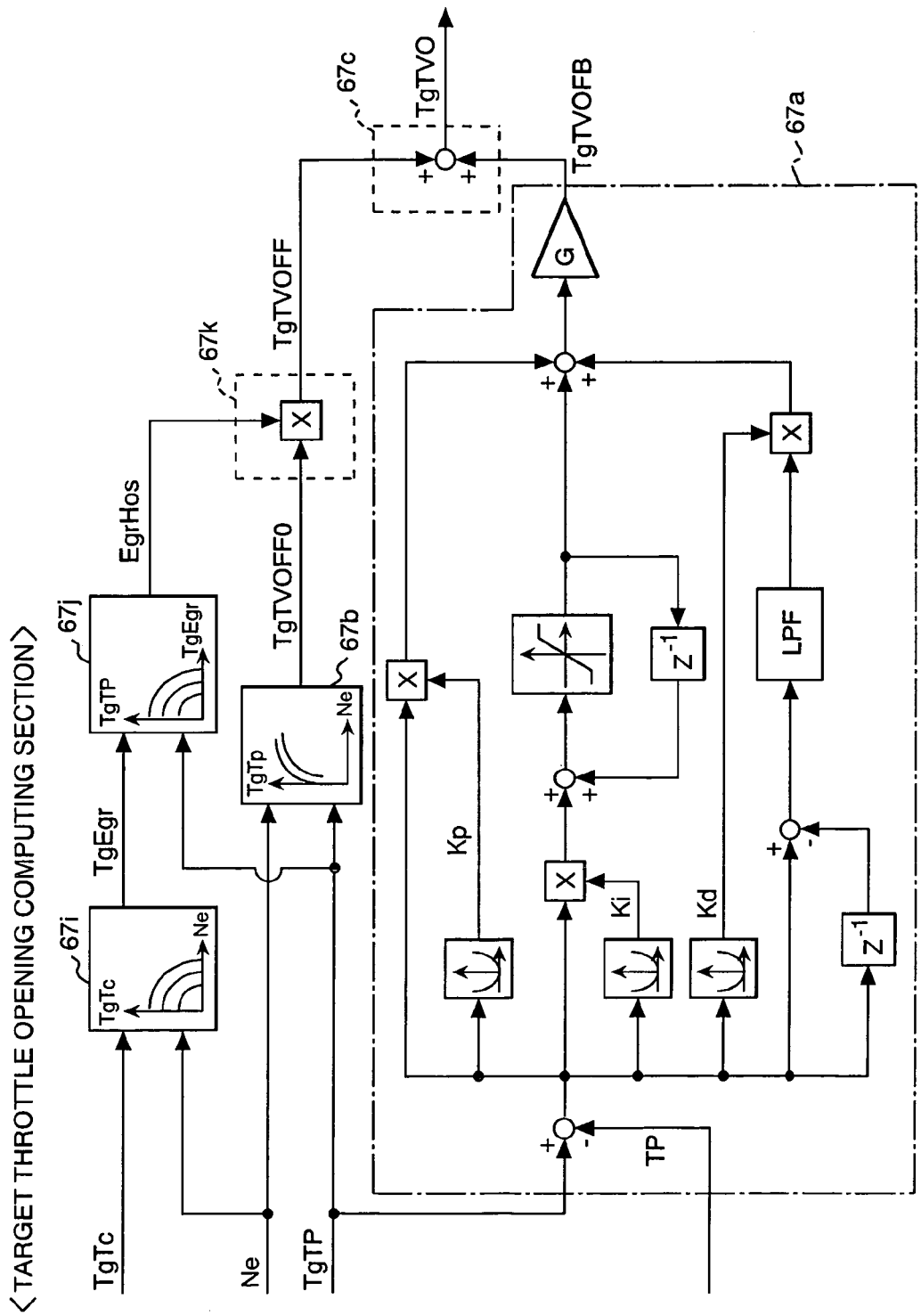
FIG. 20 is a control block diagram that illustrates a target throttle opening computing section of an internal combustion engine controller according to a sixth embodiment of the present invention.

As indicated in FIG. 20, the target throttle opening TgTVOFF, which is determined by means of feed-forward control, is calculated according to the following equation:

$$TgTVOFF = TgTVOFF0 \times EgrHos$$

where EgrHOS is a throttle opening correction factor that is used in the event of EGR, and the target throttle opening TgTVOFF0 is determined in the same manner as with the first embodiment. As indicated in FIG. 20, a map is referenced in accordance with the target combustion pressure torque TgTc and rotating speed Ne to determine the target EGR rate TgEgr. Further, a map is referenced in accordance with the target EGR rate TgEgr and target air flow rate TgTP to determine the throttle opening correction factor EgrHos. It is desirable that the settings for the maps be determined according to actual device data.

Seventh Embodiment

The control block of an internal combustion engine controller according to a seventh embodiment of the present invention will now be described in detail. The control block of the seventh embodiment differs from that of the first embodiment, which is shown in FIG. 3, in that feed-forward control is exercised in the target throttle opening computing section 67 to compute the target throttle opening TgTVOFF in accordance with an inverse model for the response characteristic between the air flow rate in the cylinder 9 and throttle 3. Further, the air flow rate in the cylinder 9 is used as the actual air flow rate Tp for feedback control.

The target torque computing section 61, fuel injection quantity computing section 62, fuel injection quantity correction section 63, target equivalence ratio computing section 64, target air flow rate computing section 65, and throttle opening control section within the control block of the seventh embodiment are the same as their counterparts described in Sections 1 to 5 and 8, respectively, under the first embodiment and will not be described again.

6. Actual Air Flow Rate Computing Section

Figure 21:
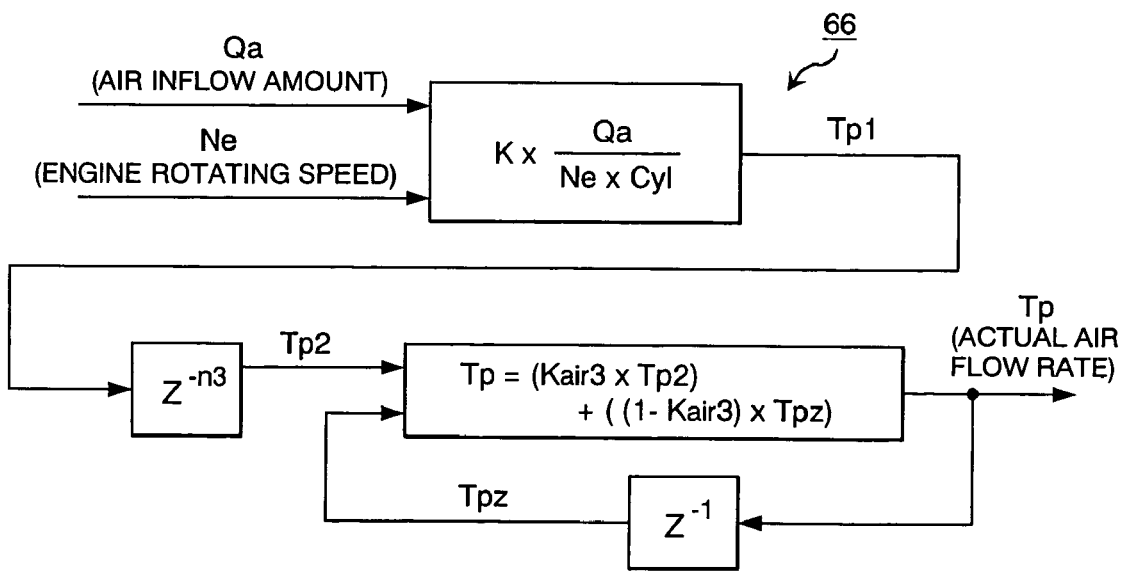
FIG. 21 is a control block diagram that illustrates an actual air flow rate computing section of an internal combustion engine controller according to a seventh embodiment of the present invention.

As indicated in FIG. 21, the air flow rate Tp1 flowing into a cylinder per cycle is subjected to the air transmission characteristic prevalent between the throttle and cylinder. The transmission characteristic is approximated with wasted time plus first-order lag. It is desirable that the settings for parameter n3, which represents wasted time, and parameter Kair3, which corresponds to a time constant for a first-order lag, be determined according to actual device data. Further, the parameter n3 and the parameter Kair3 may be varied depending on the operating conditions.

7. Target Throttle Opening Computing Section

Figure 22:
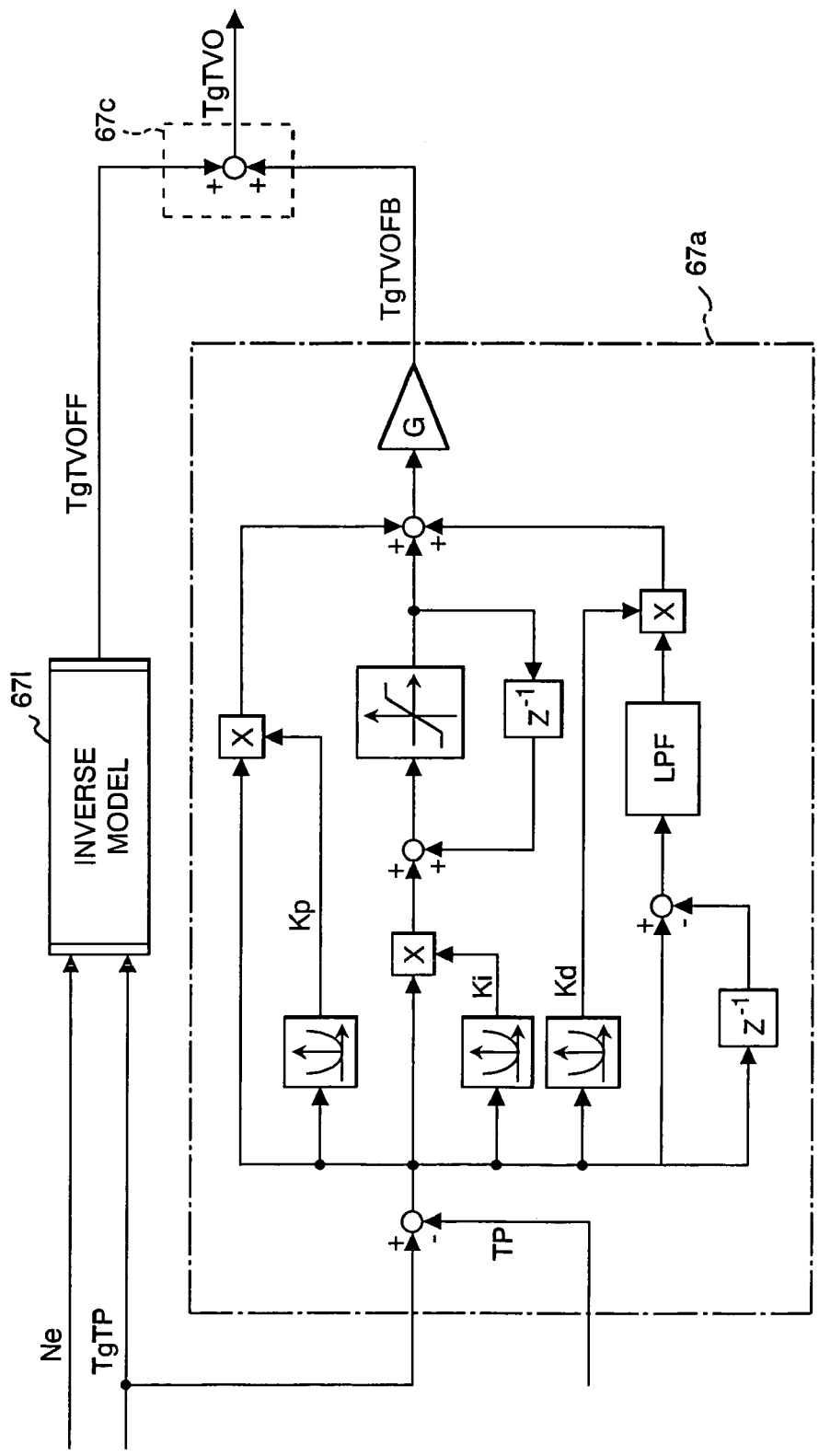
FIG. 22 is a control block diagram that illustrates a target throttle opening computing section of an internal combustion engine controller according to a seventh embodiment of the present invention.
Figure 23:
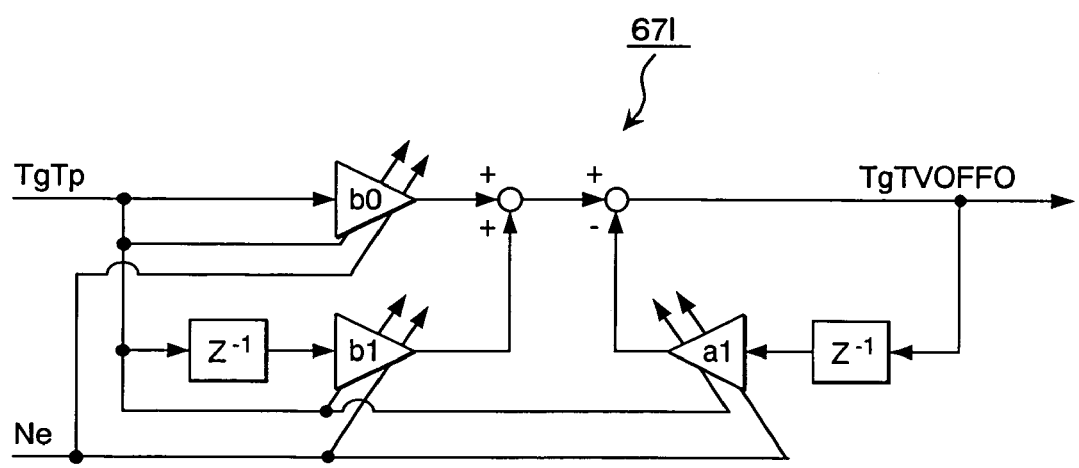
FIG. 23 is a control block diagram illustrating an inverse model for feed-forward control, which is within the target throttle opening computing section shown in FIG. 22.

As indicated in FIG. 22, an inverse filter (inverse model) $67k$ is used to determine the target throttle opening TgTVOFF for feed-forward control. Detailed specifications for the inverse filter $67k$ are shown in FIG. 23. It is desirable that the settings for a1, b0, and b1 be determined according to actual device data. It is also conceivable that the settings may be varied depending on the operating conditions.

Eighth Embodiment

Figure 24:
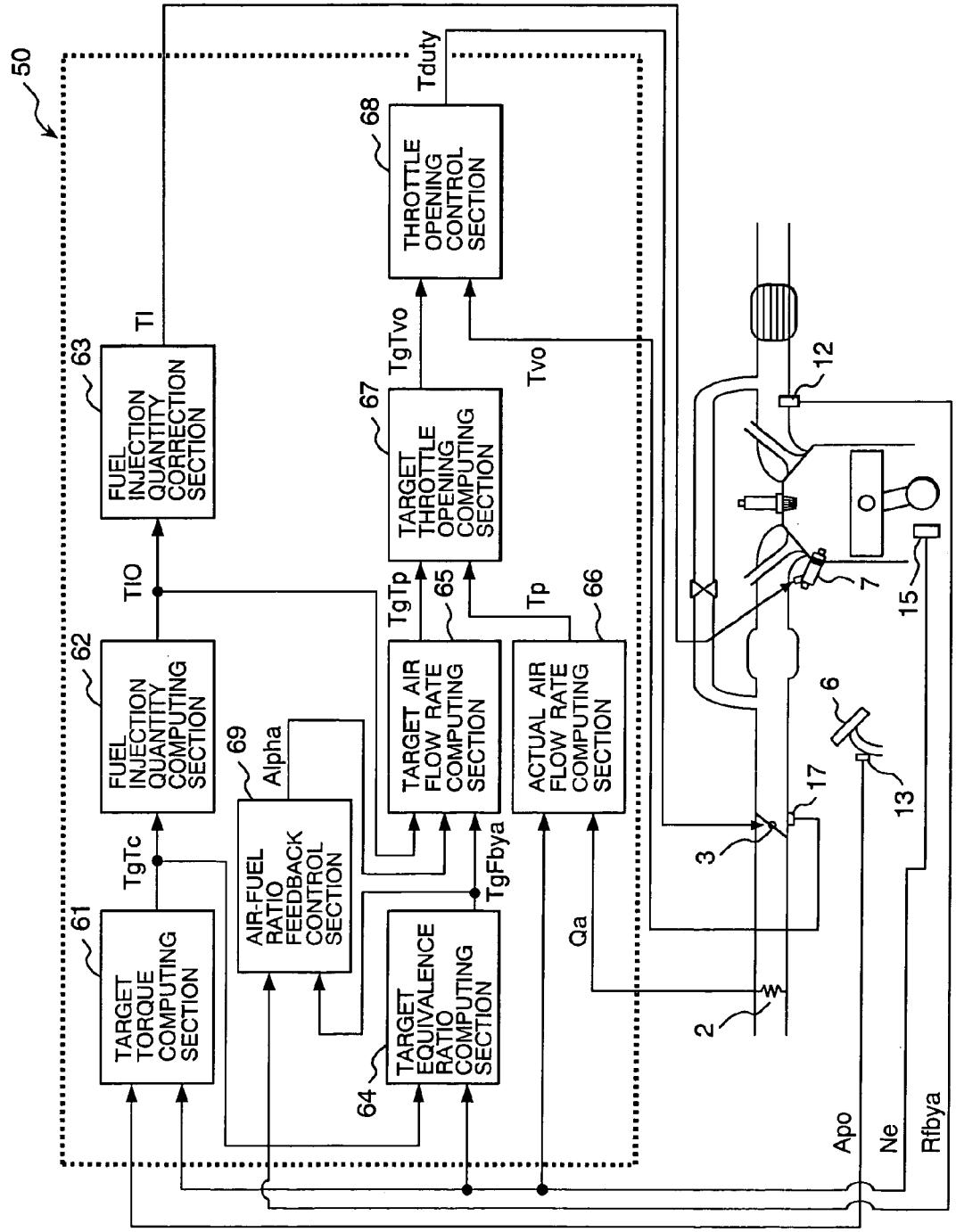
FIG. 24 is a control block diagram that illustrates an internal combustion engine controller according to an eighth embodiment of the present invention.

The control block of an internal combustion engine controller according to an eighth embodiment of the present invention will now be described in detail. FIG. 24 is a control block diagram of the eighth embodiment that illustrates the overall control of the EPU 50 shown in FIG. 2. The major portion of a fuel-based, torque-on-demand control is shown in FIG. 24.

The control block of the eighth embodiment differs from that of the first embodiment, which is shown in FIG. 3, in that an air-fuel ratio feedback control section 69 is added. The air-fuel ratio feedback control section 69 provides a manipulated variable Alpha, which is used to correct the target air flow rate TgTP that is computed by the target air flow rate computing section 65. The above functionality is added so as to correct the target air flow rate TgTP in accordance with the value output from the A/F sensor 12, which is mounted on the exhaust manifold 10.

The target torque computing section 61, fuel injection quantity computing section 62, fuel injection quantity correction section 63, target equivalence ratio computing section 64, actual air flow rate computing section 66, target throttle opening computing section 67, and throttle opening control section 68 within the control block of the eighth embodiment are the same as their counterparts described in Sections 1 to 4 and 7 to 9, respectively, under the first embodiment and will not be described again.

5. Air-Fuel Ratio Feedback Control Section

Figure 25:
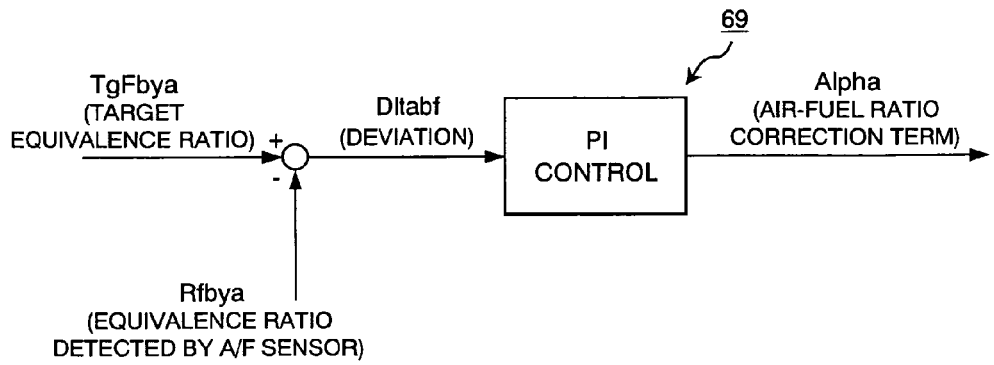
FIG. 25 is a control block diagram that illustrates an air-fuel ratio feedback control section shown in FIG. 24.

This section exercises feedback control in accordance with the equivalence ratio Rfbya, which is detected by the A/F sensor 12, so that the internal combustion engine's equivalence ratio agrees with the target equivalence ratio TgFbya under arbitrary operating conditions. More specifically, PI control is exercised as indicated in FIG. 25 to compute the air-fuel ratio correction term Alpha from the deviation between the target equivalence ratio TgFbya and the equivalence ratio Rfbya detected by the A/F sensor.

6. Target Air Flow Rate Computing Section

Figure 26:
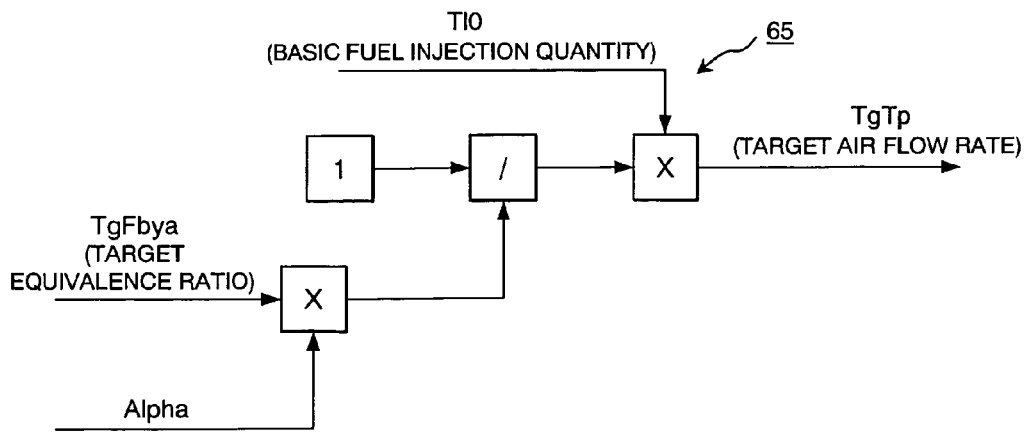
FIG. 26 is a control block diagram that illustrates a target air flow rate computing section shown in FIG. 24.
Figure 27:
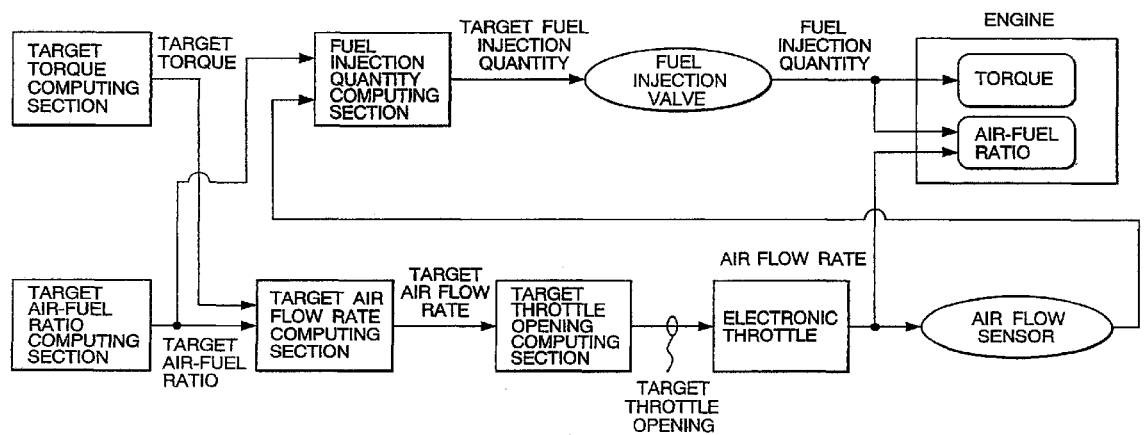
FIG. 27 is a block diagram that illustrates a conventional air-based torque-on-demand control.
Figure 28:
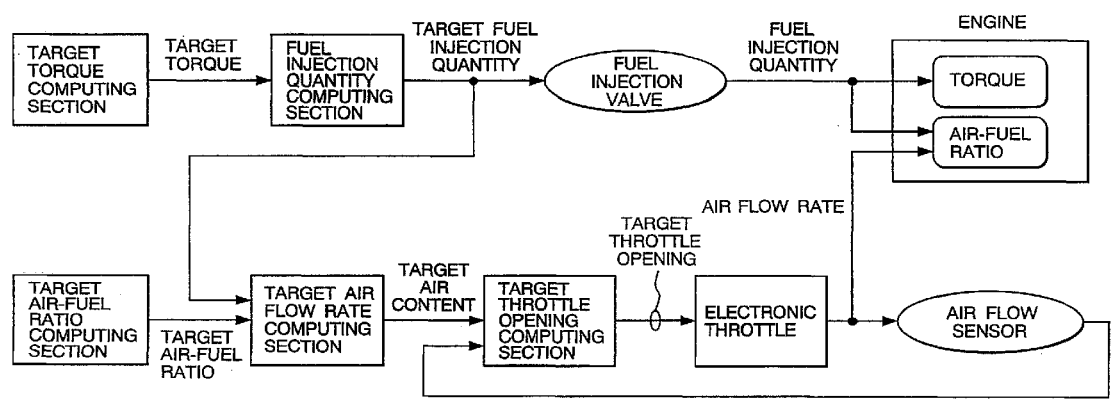
FIG. 28 is a block diagram that illustrates a conventional fuel-based torque-on-demand control.
Figure 29:
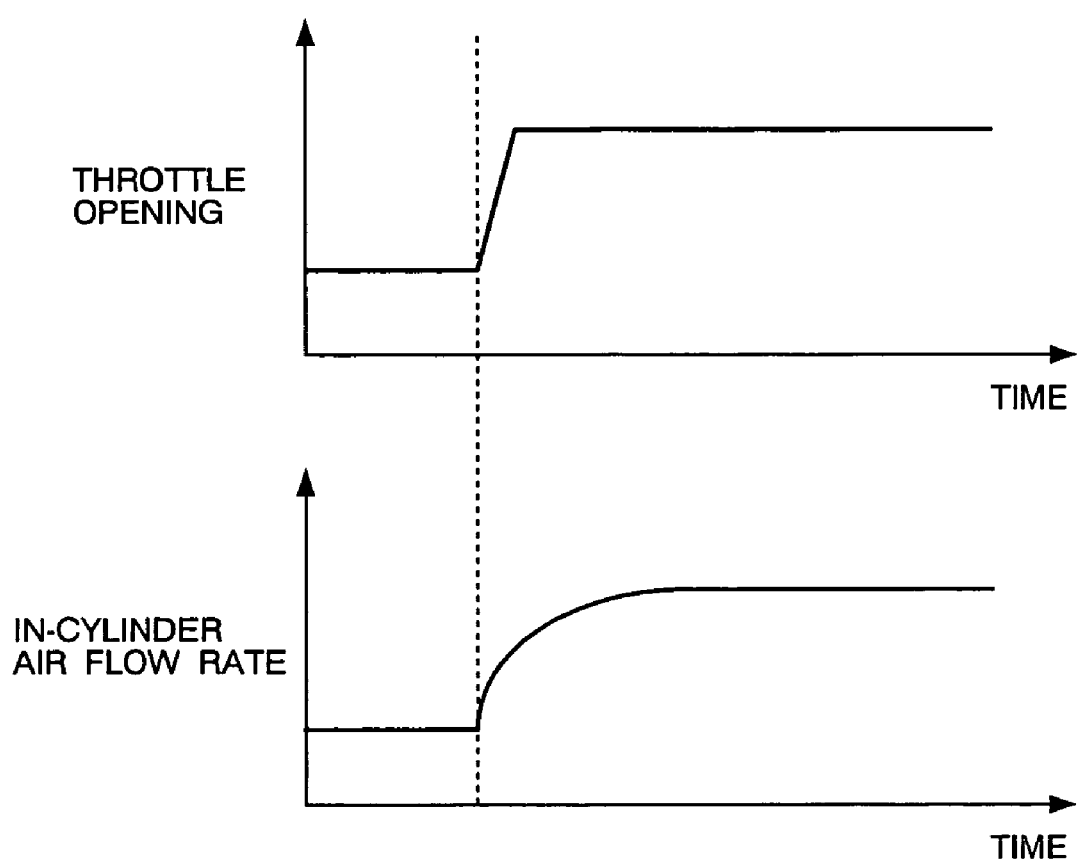
FIG. 29 shows in-cylinder air flow rate transient characteristic curves that are prevalent when an internal combustion engine's target air flow rate changes.
Figure 30:
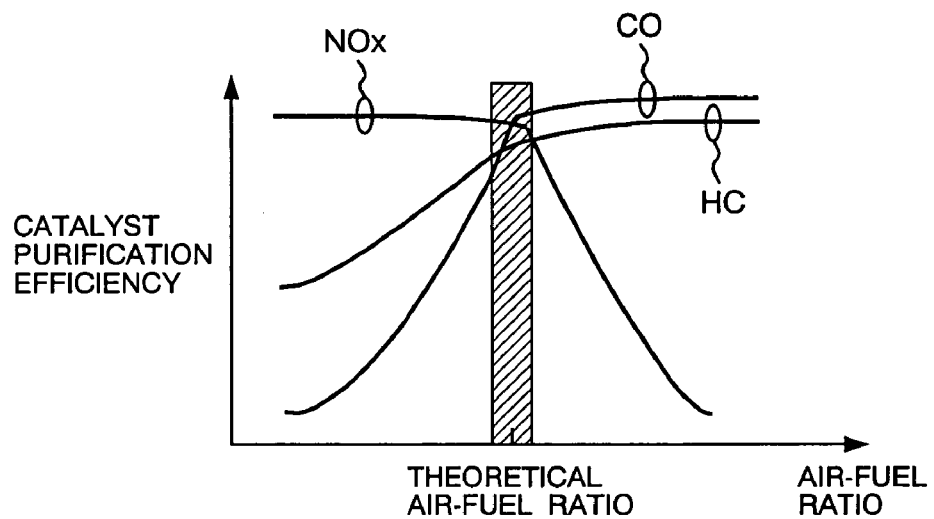
FIG. 30 shows HC, CO, and NOx purification characteristic curves of an internal combustion engine's three-way catalyst.
Figure 31:
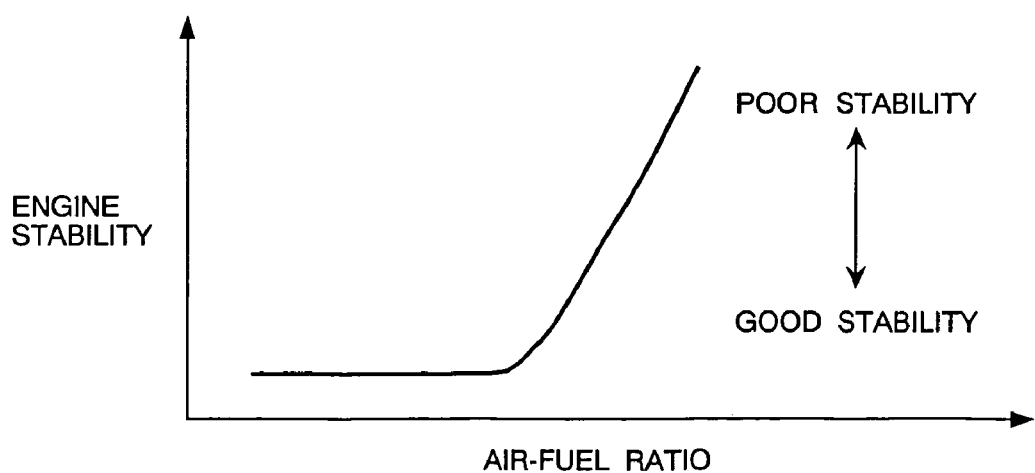
FIG. 31 shows a correlation between an internal combustion engine's air-fuel ratio and internal combustion engine stability.

As shown in FIG. 26, the target air flow rate TgTp is computed from the target equivalence ratio TgFbya and the equivalence ratio Rfbya detected by the A/F sensor. For computation, the following equation is used:

$$TgTp = TIO \times (1/(TgFbya \times Alpha))$$

Although the present invention has been described in detail with reference to the first to eighth embodiments thereof, it will be readily apparent to those skilled in the art that the present invention is not limited to those preferred embodiments, and that various design changes may be made therein without departing from the spirit and scope of the appended claims.

In the target throttle opening computing section, for instance, the target throttle opening computed by the second throttle opening computing means and the target throttle opening computed by the first throttle opening computing means are output to the third throttle opening computing means, which computes the sum of the first and second target throttle opening values and uses the computed sum as the final target throttle opening. However, the third throttle opening computing means can alternatively compute the final target throttle opening while considering not only the sum but also the product or other control element.

In the foregoing embodiments, an air flow sensor is adopted as means for measuring the air flow rate and used to measure a mass flow rate. In an alternative embodiment, however, a pressure sensor for measuring the intake pipe internal pressure may also be used.

INDUSTRIAL APPLICABILITY

As described above, the internal combustion engine controller according to the present invention comprises a first throttle opening computing means, which computes a throttle opening in accordance with a value detected by an air flow sensor, and a second throttle opening computing means, which computes a throttle opening without using a value detected by an air flow sensor. Therefore, when used in a fuel-based torque-on-demand control type internal combustion engine, the internal combustion engine controller according to the present invention can improve air flow rate response and convergence, reduce the exhaust gas emission, and provides improved torque response without being affected by various environmental changes or sensor, actuator, and other component variations.

The invention claimed is:

1. An internal combustion engine controller, comprising:
   means for computing a target throttle opening from operating conditions of said engine;
   wherein the means for computing said target throttle opening includes,
   a first computing section for determining a first target throttle opening by performing feedback control in accordance with operating conditions including an actual intake air flow rate;
   a second computing section for determining a second target throttle opening by performing feed-forward control in accordance with operating conditions other than said actual intake air flow rate; and
   a third computing section for determining a third target throttle opening as a final decision value of said target throttle opening in accordance with said first target throttle opening and said second target throttle opening.

2. The internal combustion engine controller according to claim 1, wherein said second computing section computes said second target throttle opening in accordance with rotating speed of said engine and said target air flow rate.

3. The internal combustion engine controller according to claim 1, wherein the actual air flow rate is a value obtained by detecting an in-cylinder air flow rate.

4. An internal combustion engine controller, comprising:
- a target air flow rate computing section for computing a target air flow rate in accordance with operating conditions of said engine;
- a first computing section for determining a first target throttle opening by performing feedback control in accordance with a difference between said target air flow rate and an actual air flow rate;
- a second computing section for determining a second target throttle opening by performing feed-forward control in accordance with said target air flow rate; and
- a third computing section for determining a third target throttle opening as a final decision value of said target throttle opening in accordance with said first target throttle opening and said second target throttle opening.

5. An internal combustion engine controller, comprising:
- a control unit for computing a target throttle opening from operating conditions of said engine;
- wherein the control unit includes,
- a first computing section for determining a first target throttle opening by performing feedback control in accordance with operating conditions including an actual intake air flow rate;
- a second computing section for determining a second target throttle opening by performing feed-forward control in accordance with operating conditions other than said actual air flow rate;
- a third computing section for determining a third target throttle opening as a final decision value of said target throttle opening in accordance with said first target throttle opening and said second target throttle opening; and
- a throttle opening control section for driving a throttle valve in accordance with said third target throttle opening.

6. The internal combustion engine controller according to claim 5, wherein said throttle opening control section comprises means for controlling a throttle in such a manner as to reduce a difference between a target throttle opening calculated by said third computing means and a detected actual throttle opening.

* * * * *